United States Patent
Makino et al.

(10) Patent No.: US 10,235,255 B2
(45) Date of Patent: Mar. 19, 2019

(54) INFORMATION PROCESSING SYSTEM AND CONTROL APPARATUS

(71) Applicant: FUJITSU LIMITED, Kawasaki-shi, Kanagawa (JP)

(72) Inventors: Tsukasa Makino, Yokohama (JP); Mihoko Nakajima, Yokohama (JP); Reina Okano, Hadano (JP); Yuki Yamamoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 248 days.

(21) Appl. No.: 15/081,997

(22) Filed: Mar. 28, 2016

(65) Prior Publication Data

US 2016/0321146 A1 Nov. 3, 2016

(30) Foreign Application Priority Data

Apr. 30, 2015 (JP) ................................. 2015-093247

(51) Int. Cl.
*G06F 11/00* (2006.01)
*G06F 11/20* (2006.01)
*G06F 1/30* (2006.01)

(52) U.S. Cl.
CPC .............. *G06F 11/203* (2013.01); *G06F 1/30* (2013.01); *G06F 2201/85* (2013.01); *G06F 2212/604* (2013.01)

(58) Field of Classification Search
CPC .................................................. G06F 11/203
See application file for complete search history.

(56) References Cited

U.S. PATENT DOCUMENTS

| 8,463,825 B1 * | 6/2013 | Harty ................ G06F 17/30233 707/813 |
| 2004/0078663 A1 * | 4/2004 | Inaba ...................... G06F 1/266 714/22 |
| 2007/0067668 A1 * | 3/2007 | Yuzawa .............. G06F 11/1415 714/6.12 |

(Continued)

FOREIGN PATENT DOCUMENTS

| JP | 2010-160654 | 7/2010 |
| JP | 2014-215661 | 11/2014 |
| WO | 2004/114115 | 12/2004 |

*Primary Examiner* — Bryce P Bonzo
*Assistant Examiner* — Katherine Lin
(74) *Attorney, Agent, or Firm* — Fujitsu Patent Center

(57) ABSTRACT

An information processing system includes first to third information processing apparatuses. The first information processing apparatus has a first memory with a cache region and outputs a first power failure signal on detecting a power failure. The second information processing apparatus includes a second memory with a mirror cache region that stores mirror data for the cache region and outputs a second power failure signal on detecting a power failure. The third information processing apparatus monitors the first and second information processing apparatuses and, when both apparatuses have stopped operating, determines whether there is a power failure at the first and second information processing apparatuses based on the first and second power failure signals. When there is no power failure at either apparatus, the first and second information processing apparatuses are restarted in a state where data of the first and second memories is held.

8 Claims, 15 Drawing Sheets

(56) References Cited

U.S. PATENT DOCUMENTS

2011/0191535 A1* 8/2011 Yuasa .................... G06F 12/08
 711/113
2011/0202791 A1* 8/2011 Saitou ................. G06F 11/2089
 714/6.12
2014/0164814 A1* 6/2014 Henise, IV ............... G06F 1/28
 713/340
2014/0317436 A1 10/2014 Yuasa et al.

* cited by examiner

FIG. 7

CONTROLLER MODULE MONITORING TABLE — 116a

| CM | STATE | MIRROR CACHE | CAUSE | TOTAL SCORE |
|---|---|---|---|---|
| CM01 | NORMAL | CM03 | – | – |
| CM02 | NORMAL | CM04 | – | 0 |
| CM03 | DOWN | CM05 | POWER FAILURE | 11 |
| CM04 | DOWN | CM06 | POWER FAILURE | 10 |
| CM05 | NORMAL | CM02 | – | 1 |
| CM06 | NORMAL | CM01 | – | 2 |
| ... | ... | ... | ... | ... |

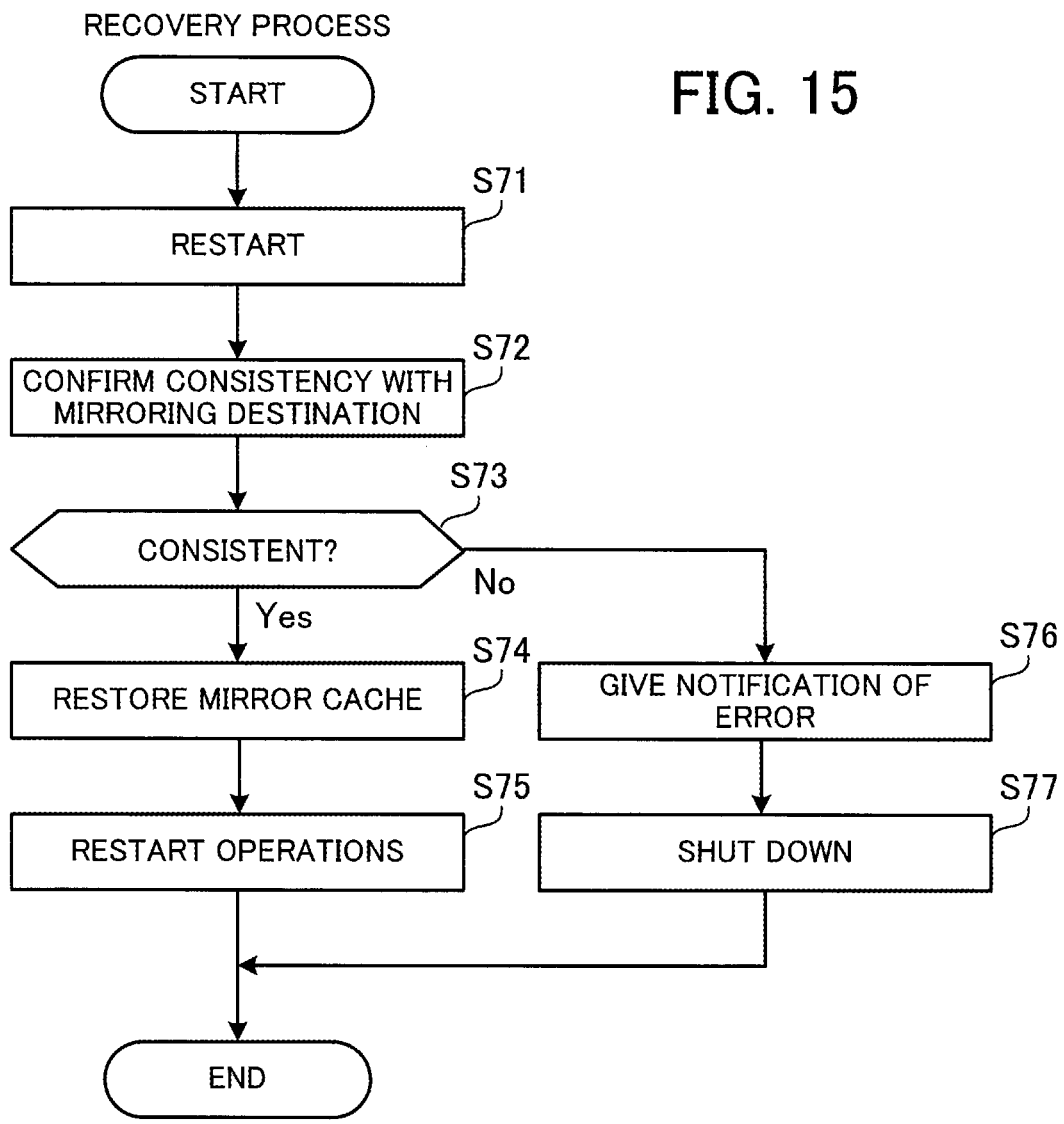

INFORMATION PROCESSING SYSTEM AND CONTROL APPARATUS

CROSS-REFERENCE TO RELATED APPLICATION

This application is based upon and claims the benefit of priority of the prior Japanese Patent Application No. 2015-093247, filed on Apr. 30, 2015, the entire contents of which are incorporated herein by reference.

FIELD

The present embodiments discussed herein are related to an information processing system and a control apparatus.

BACKGROUND

Data mirroring is widely used to prevent data loss. As one example, in some systems equipped with a plurality of information processing apparatuses, the content of a cache memory of one information processing apparatus is mirrored in a cache memory of another information processing apparatus.

One example of a mirroring technology is a proposed storage system where a plurality of storage control apparatuses are each equipped with a local cache and a mirror cache and cache memories are cyclically duplicated by duplicating the local cache of one storage control apparatus in the mirror cache of an adjacent storage control apparatus.

Another proposed technology relating to data protection stops any processing that is running when a power failure is detected for a storage apparatus so as to protect cache data that would be lost due to a loss of power. As one example, cache data may be held for a certain period following a power failure using power supplied from a battery. When a power failure continues beyond the certain period, the cache data can be protected by writing in a nonvolatile memory.

See, for example, the following documents:
International Publication Pamphlet No. WO2004-114115; and
Japanese Laid-Open Patent Publication No. 2014-215661.

However, an information processing apparatus can go down not only due to a power failure but also due to a software error where inconsistent data is inputted into a CPU (Central Processing Unit) that controls the operations of the information processing apparatus. When an apparatus goes down due to a software error, it may be possible to recover the information processing apparatus using a method called "machine recovery" where the information processing apparatus is restarted in a state where the content of the memory is held. In particular, when two information processing apparatuses that both store cache data and mirror data for such cache data go down due to a software error, by having both information processing apparatuses execute a machine recovery, it is possible to quickly recover the system with the cache data in the duplicated state.

On the other hand, there are also systems with a plurality of information processing apparatuses where the respective information processing apparatuses monitor the state of each other and can detect when another information processing apparatus has gone down. However, it is difficult to specify the cause of the other information processing apparatus going down. When an information processing apparatus system that went down due to a power failure is instructed to execute machine recovery as described above, such machine recovery will not be executed. In this situation, cache data and mirror data that were stored in the memory of the information processing apparatus that went down are lost, resulting in a potential loss of reliability for the operations of such information processing apparatus.

SUMMARY

According to one aspect, there is provided an information processing system including: a first information processing apparatus including a first memory with a cache region, a first power supply that supplies power to the first memory, and a first processor that monitors the first power supply and outputs a first power failure signal on detecting a power failure; a second information processing apparatus including a second memory with a mirror cache region that stores mirror data for data stored in the cache region, a second power supply that supplies power to the second memory, and a second processor that monitors the second power supply and outputs a second power failure signal on detecting a power failure; and a third information processing apparatus that monitors operations of the first information processing apparatus and the second information processing apparatus, determines, upon detecting that the operations have stopped at both the first information processing apparatus and the second information processing apparatus, whether there is a power failure state at the first information processing apparatus and the second information processing apparatus based on presence of the first power failure signal and presence of the power failure signal, and, when there is no power failure at either the first information processing apparatus or the second information processing apparatus, restarts the first information processing apparatus in a state where data of the first memory is held and restarts the second information processing apparatus in a state where data of the second memory is held.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 depicts an example of a controller module monitoring table;

FIG. 15 is a flowchart depicting an example recovery process at a controller module that executes machine recovery due to the occurrence of a software error.

DESCRIPTION OF EMBODIMENTS

Figure 1:
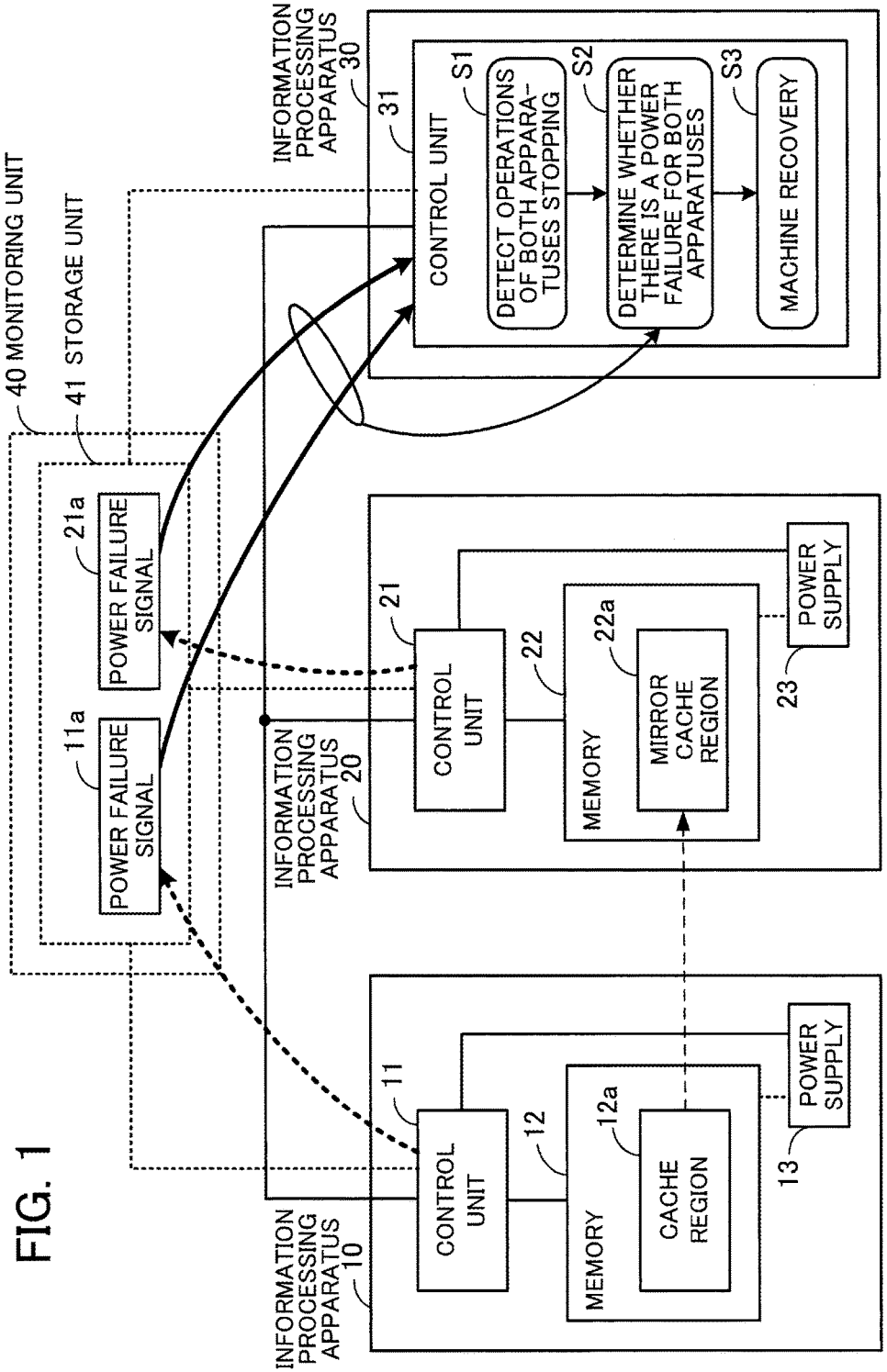
FIG. 1 depicts an example configuration of an information processing system according to a first embodiment.

Several embodiments will be described below with reference to the accompanying drawings, wherein like reference numerals refer to like elements throughout.

First Embodiment

FIG. 1 depicts an example configuration of an information processing system according to a first embodiment. The information processing system in FIG. 1 includes information processing apparatuses 10, 20, and 30.

The information processing apparatus 10 includes a control unit 11, a memory 12, and a power supply 13. The information processing apparatus 20 includes a control unit 21, a memory 22, and a power supply 23. The information processing apparatus 30 includes a control unit 31. The information processing apparatuses 10, 20, and 30 are connected to each other via a network, a bus, or the like.

As examples, the control units 11, 21, and 31 are each implemented as a processor that may include a CPU, a DSP (Digital Signal Processor), an ASIC (Application Specific Integrated Circuit), and an FPGA (Field Programmable Gate Array). Such processor may include a group of processors (a so-called "multiprocessor"). The memories 12 and 22 are volatile memories such as RAM (Random Access Memory). The power supply 13 supplies power to at least the memory 12 out of the component elements of the information processing apparatus 10. The power supply 13 may supply power to the entire information processing apparatus 10. The power supply 23 supplies power to at least the memory 22 out of the component elements of the information processing apparatus 20. The power supply 23 may supply power to the entire information processing apparatus 20.

The memory 12 has a cache region 12a. The information processing apparatus 10 uses the cache region 12a to execute access control for storage apparatuses that are internally mounted or externally connected. On the other hand, the memory 22 has a mirror cache region 22a. The mirror cache region 22a stores mirror data for the data stored in the cache region 12a. As one example, whenever the data in the cache region 12a is updated, the updated content is also reflected in the mirror cache region 22a.

The control unit 11 monitors the power supply and, on detecting a power failure, outputs a power failure signal 11a. The control unit 21 monitors the power supply 23 and, on detecting a power failure, outputs a power failure signal 21a. The information processing apparatus 30 is capable of checking whether the power failure signals 11a and 21a have been outputted. As one example, information indicating that a power failure signal 11a or 21a has been outputted is stored in a storage apparatus that can be accessed by the information processing apparatus 30. Such storage apparatus may be a storage unit 41 that is provided externally to and shared by the information processing apparatuses 10 and 20 as illustrated in FIG. 1, or may be nonvolatile storage apparatuses that are separately provided for the information processing apparatuses 10 and 20. With the former configuration, as one example, power failure monitoring information (not shown) based on whether the power failure signal 11a has been received and whether the power failure signal 21a has been received may be stored in the storage unit 41 by a monitoring unit. Here, the information processing apparatus 30 determines whether a power failure signal 11a or 21a has been outputted based on the power failure monitoring information. The power failure signals 11a and 21a may also be transmitted to the information processing apparatus 30.

The control unit 31 monitors the operations of the information processing apparatuses 10 and 20 and determines whether the respective apparatuses are operating. As one example, the control unit 31 transmits a monitoring signal to both information processing apparatuses 10 and 20 and determines whether the respective apparatuses are operating based on whether a reply to such monitoring signal is received. On detecting that both of the information processing apparatuses 10 and 20 have stopped operating (step S1), the control unit determines whether a power failure has occurred for the respective information processing apparatuses 10 and 20 based on whether the power failure signals 11a and 21a have been outputted.

When a power failure has not occurred for either of the information processing apparatuses 10 and (that is, when there has been no power failure for either of the power supplies 13 and 23), the control unit 31 has the information processing apparatus 10 restart in a state where the data in the memory 12 is held. The control unit 31 also has the information processing apparatus 20 restart in a state where the data in the memory 22 is held (step S3). Note that restarting information processing in a state where memory data is held is referred to here as "machine recovery".

Here, when the information processing apparatus 10 has stopped operating but the power failure signal 11a has not been outputted and there has been no power failure at the information processing apparatus 10, the control unit 31 can determine that the information processing apparatus 10 has gone down due to a software error. In the same way, when the information processing apparatus 20 has stopped operating but the power failure signal 21a has not been outputted and there has been no power failure at the information processing apparatus 20, the control unit 31 can determine that the information processing apparatus 20 has gone down due to a software error.

When an information processing apparatus has gone down due to a software error, by causing such information processing apparatus to execute a machine recovery, it may be possible to recover the information processing apparatus using the data held in the memory before the machine recovery was executed. However, it is not possible to have an information processing apparatus with a power failure execute a machine recovery.

When there has been a power failure at one of the information processing apparatuses 10 and 20 that have both stopped operating, even when a machine recovery instruction is given to both apparatuses, a machine recovery will not be executed at the apparatus with the power failure. This means that even when one apparatus is restarted in a state where data is held in the memory, one of the cache region 12a and the mirror cache region 22a will not become useable and it will not be possible to restart operations in a state where the data in such regions is duplicated. In addition, when a machine recovery instruction is given to an information processing apparatus with a power failure, there is also the risk of the content of the memory being lost.

In the present embodiment, the control unit 31 can accurately determine whether the information processing apparatuses 10 and 20 have stopped operating due to a software error based on whether the respective power failure signals 11a and 21 have been outputted. On confirming that the cause of both information processing apparatuses stopping operations is a software error, the control unit 31 has a machine recovery executed at both apparatuses. By doing so, it is possible to avoid the risk of data loss during recovery by the information processing apparatuses 10 and 20. In other words, it is possible to increase the probability that the information processing apparatuses 10 and 20 can restart operations in a state where the data in the cache region 12a and the mirror cache region 22a is duplicated without the data in such regions being lost. That is, it is possible to raise the probability that the information processing apparatuses 10 and 20 can properly recover in a state where the cache data is safely kept.

Second Embodiment

Figure 2:
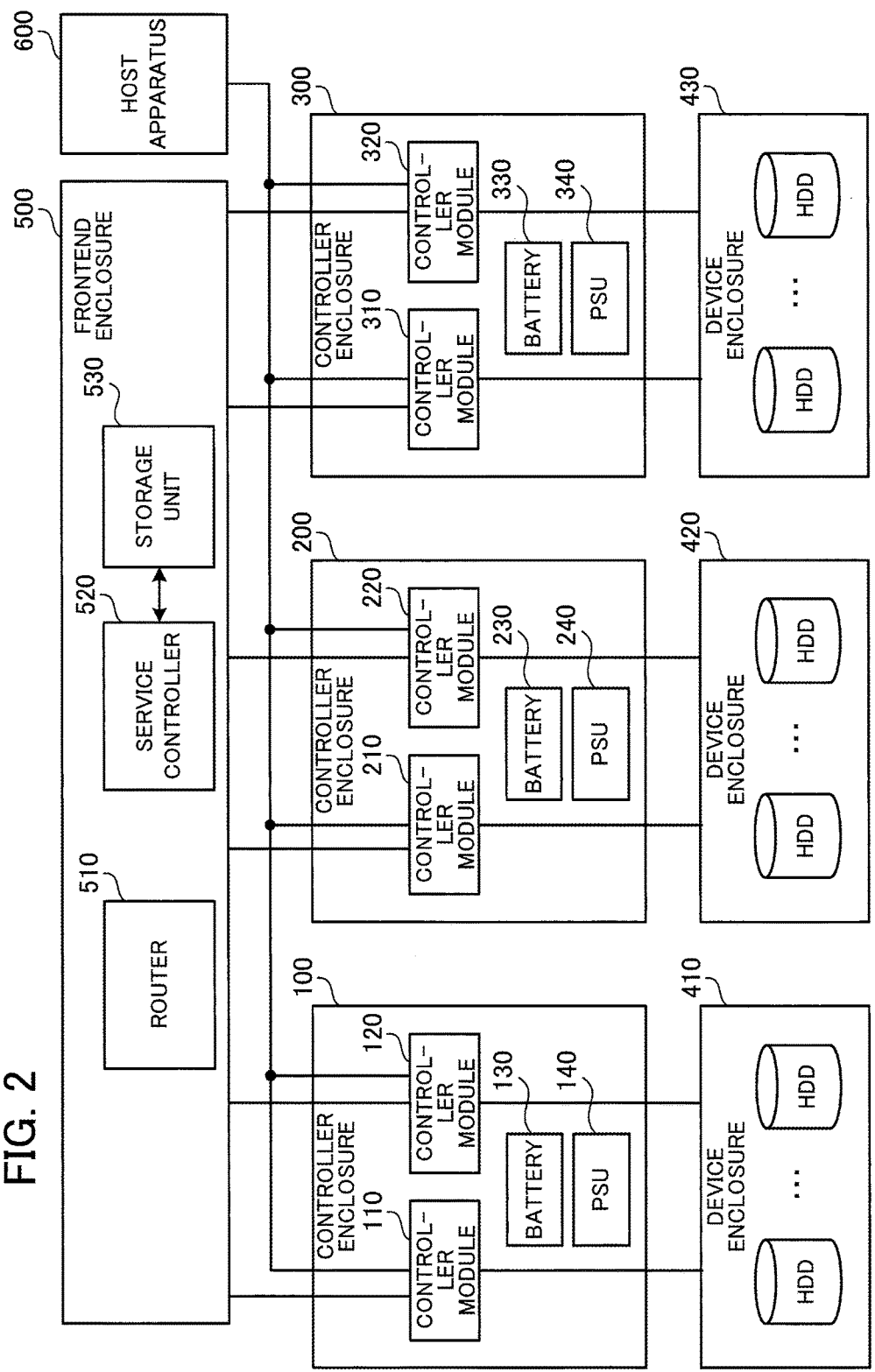
FIG. 2 depicts an example configuration of a storage system according to a second embodiment.

FIG. 2 depicts an example configuration of a storage system according to a second embodiment. The storage system includes controller enclosures 100, 200, and 300, device enclosures 410, 420, and 430, a frontend enclosure 500, and a host apparatus 600.

The controller enclosure 100 includes a controller module 110, a controller module 120, a battery 130, and a power supply unit (PSU) 140. The controller enclosure 200 includes a controller module 210, a controller module 220, a battery 230, and a PSU 240. The controller enclosure 300 includes a controller module 310, a controller module 320, a battery 330, and a PSU 340.

The host apparatus 600 is connected to the controller modules 110, 120, 210, 220, 310, and 320. As one example, the controller modules 110, 120, 210, 220, 310, and 320 and the host apparatus 600 are connected via a SAN (Storage Area Network) using a fiber channel, iSCSI (Internet Small Computer System Interface), or the like. Note that although a single host apparatus 600 is connected to the controller modules 110, 120, 210, 220, 310, and 320 in the example in FIG. 2, it is also possible to respectively connect a plurality of host apparatuses to one or more controller modules.

A plurality of storage apparatuses to be accessed from the host apparatus 600 are mounted in the device enclosures 410, 420, and 430. In the present embodiment, the device enclosures 410, 420, and 430 are disk array apparatuses equipped with HDDs (Hard Disk Drives) as storage apparatuses. Note that the storage apparatuses mounted in the device enclosures 410, 420, and 430 may be other types of storage apparatuses such as SSDs (Solid State Drives).

The device enclosure 410 is connected to the controller modules 110 and 120. The controller modules 110 and 120 each include a memory that implements a cache region and, in accordance with requests from the host apparatus 600, accesses to the HDDs mounted in the device enclosure 410 are controlled using the cache regions implemented in the respective memories. The device enclosure 420 is connected to the controller modules 210 and 220. The controller modules 210 and 220 each include a memory that implements a cache region and, in accordance with requests from the host apparatus 600, accesses to the HDDs mounted in the device enclosure 420 are controlled using the cache regions implemented in the respective memories. The device enclosure 430 is connected to the controller modules 310 and 320. The controller modules 310 and 320 each include a memory that implements a cache region and, in accordance with requests from the host apparatus 600, accesses to the HDDs mounted in the device enclosure 430 are controlled using the cache regions implemented in the respective memories.

Note that as one example, the controller enclosure 100 and the device enclosure 410 are realized as a storage apparatus mounted in a single housing. This is also the same for the controller enclosure 200 and the device enclosure 420, and the controller enclosure 300 and the device enclosure 430. The storage system in FIG. 2 is configured by scaling out such storage apparatuses.

The number of controller enclosures included in the storage system is not limited to three, and the number of controller modules included in each controller enclosure is not limited to two. As one example, the storage system may include twelve drive enclosures that are each equipped with two controller modules. Each of the controller modules 110, 120, 210, 220, 310, and 320 may also control accesses to HDDs in drive enclosures connected to other controller modules in accordance with requests from the host apparatus 600.

The controller modules 110, 120, 210, 220, 310, and 320 are described in detail below. The controller modules 110 and 120 perform processing such as managing the cache regions implemented therein and monitoring the battery 130 and the PSU 140. During a power failure, the battery 130 supplies power to the memories in which the cache regions of the controller modules 110 and 120 are implemented. During a power failure, the battery 130 also supplies power that enables the controller modules 110 and 120 to execute a power failure process. The PSU 140 supplies power to the entire controller enclosure 100.

The controller modules 210 and 220 perform processing such as managing the cache regions implemented therein and monitoring the battery 230 and the PSU 240. The battery 230 supplies power to the controller modules 210 and 220 during a power failure. The PSU 240 supplies power to the entire controller enclosure 200. The controller modules 310 and 320 perform processing such as managing the cache regions implemented therein and monitoring the battery 330 and the PSU 340. The battery 330 supplies power to the controller modules 310 and 320 during a power failure. The PSU 340 supplies power to the entire controller enclosure 300.

The frontend enclosure 500 includes a router 510, a service controller 520, and a storage unit 530.

The router 510 is connected to the controller modules 110, 120, 210, 220, 310, and 320 and relays signals transferred between the controller modules. The controller modules 110, 120, 210, 220, 310, and 320 are capable of communicating with each other via the router 510.

The service controller 520 communicates individually with the controller modules 110, 120, 210, 220, 310, and 320. The service controller 520 manages the monitoring results of the PSUs 140, 240, and 340 of the controller modules 110, 120, 210, 220, 310, and 320. More specifically, the service controller 520 acquires monitoring information for the PSUs 140, 240, and 340 from the controller modules 110, 120, 210, 220, 310, and 320 and generates power failure monitoring information. The power failure monitoring information indicates the existence of power failures detected by each of the controller modules 110, 120, 210, 220, 310, and 320. The service controller 520 stores the power failure monitoring information in the storage unit 530 and provides the power failure monitoring information in accordance with requests from the controller modules 110, 120, 210, 220, 310, and 320. The storage unit 530 is implemented by a storage apparatus such as RAM or flash memory, and stores the power failure monitoring information.

The hardware configuration of the controller modules 110, 120, 210, 220, 310, and 320 will now be described with the controller module 110 as a representative example.

Figure 3:
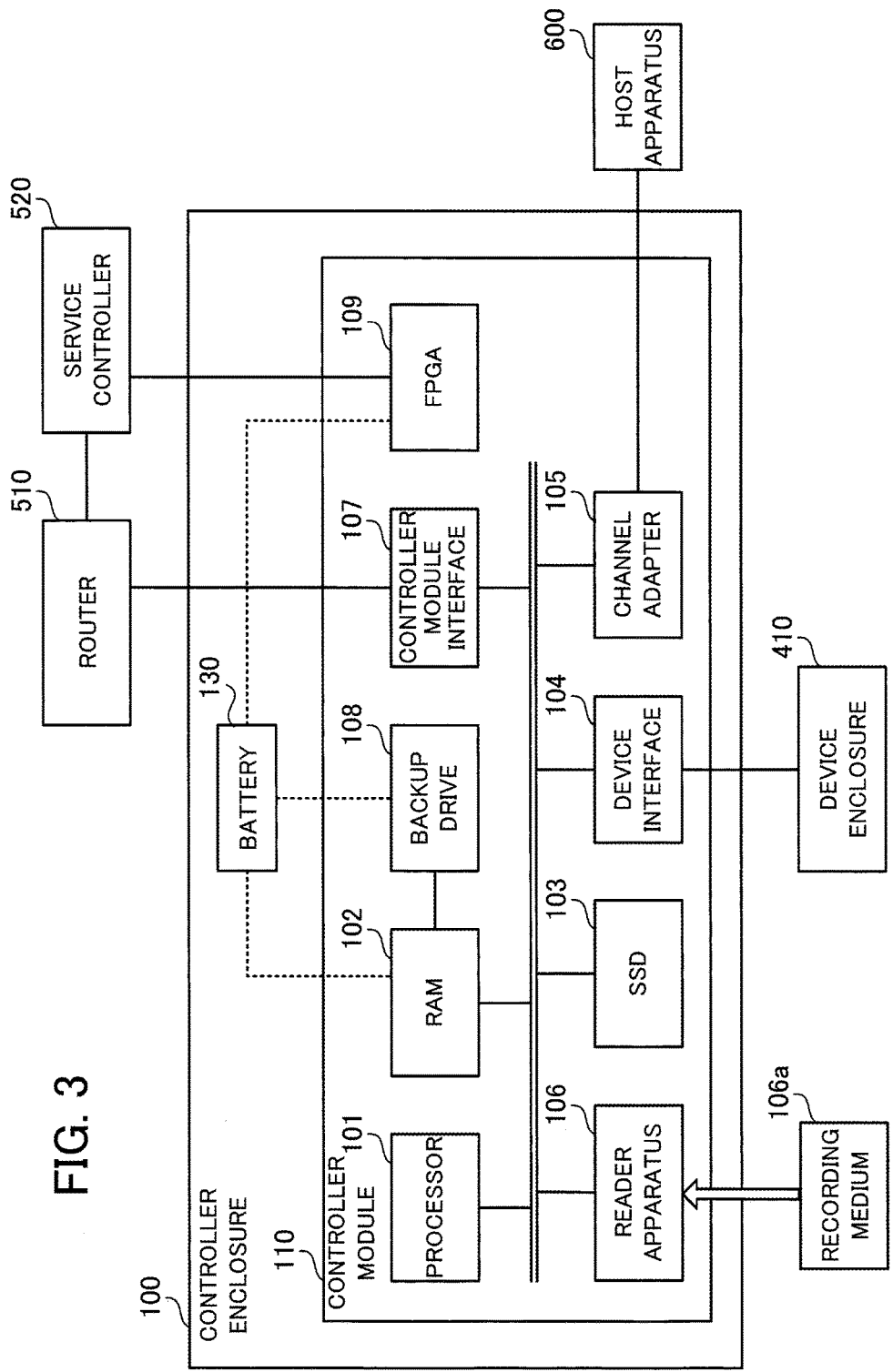
FIG. 3 depicts an example hardware configuration of a controller module.

FIG. 3 depicts an example hardware configuration of a controller module. Component elements that are the same as in FIG. 2 have been assigned the same reference numerals and description thereof is omitted.

The controller module 110 includes a processor 101, a RAM 102, a solid state drive (SSD) 103, a device interface 104, a channel adapter 105, a reader apparatus 106, a controller module interface (CMIF) 107, a backup drive 108, and an FPGA 109.

The processor 101 controls information processing by the controller module 110. The processor 101 may be a multiprocessor that includes a plurality of processing elements.

The RAM 102 is a main storage apparatus of the controller module 110. The RAM 102 temporarily stores at least part of an operating system (OS) program and an application program executed by the processor 101. The RAM 102 also stores various data used in processing by the processor 101. A cache is also implemented in a predetermined region of the RAM 102.

The SSD 103 is an auxiliary storage apparatus of the controller module 110. The SSD 103 is a nonvolatile semiconductor memory. OS programs, application programs, and various data are stored in the SSD 103. Note that the controller module 110 may be equipped with an HDD in place of the SSD 103 as an auxiliary storage apparatus.

The device interface 104 is an interface for communicating with the device enclosure 410. As one example, the device interface 104 is implemented as a SAS (Serial Attached SCSI) interface. The channel adapter 105 is an interface for communicating with the host apparatus 600.

The reader apparatus 106 reads programs and data recorded on a portable recording medium 106a. As examples of the portable recording medium 106a, it is possible to use a magnetic disk such as a flexible disk or an HDD, an optical disc such as a compact disc (CD) or a digital versatile disc (DVD), or a magneto-optical (MO) disk. As another example, it is also possible to use a nonvolatile semiconductor memory, such as a flash memory card, as the recording medium 106a. In accordance with instructions from the processor 101, for example, the reader apparatus 106 transmits programs and data read from the recording medium 106a to the processor 101.

The controller module interface 107 is an interface for communicating with other controller modules via the router 510.

The backup drive 108 is a nonvolatile recording medium used to protect the data in the RAM 102 when a power failure occurs. As the recording medium, it is possible for example to use a semiconductor memory such as flash memory. When a power failure occurs, the data in the RAM 102 is written into the backup drive 108 in accordance with an instruction from the FPGA 109. Note that after a power failure occurs, the RAM 102 and the backup drive 108 are driven by power supplied from the battery 130.

The FPGA 109 is capable of being driven by power supplied from the battery 130 after a power failure occurs. The FPGA 109 monitors a state signal of the PSU 140 of the controller enclosure 100 and detects a power failure. The FPGA 109 has a communication function for communicating with the service controller 520 and notifies the service controller 520 of the detection result for a power failure. On detecting a power failure, the FPGA 109 creates a data image of the RAM 102 in the backup drive 108 and stops operating when the data image is complete.

In addition, in accordance with an execution instruction for a machine recovery received via the service controller 520 from another controller module, the FPGA 109 resets the processor 101 in a state where the data stored in the RAM 102 is held and restarts the controller module 110. When the service controller 520 has detected a power failure for the frontend enclosure 500, the FPGA 109 also receives notification that a power failure has been detected from the service controller 520.

Note that the controller modules 120, 210, 220, 310, and 320 can be realized by the same hardware configuration as the controller module 110.

Figure 4:
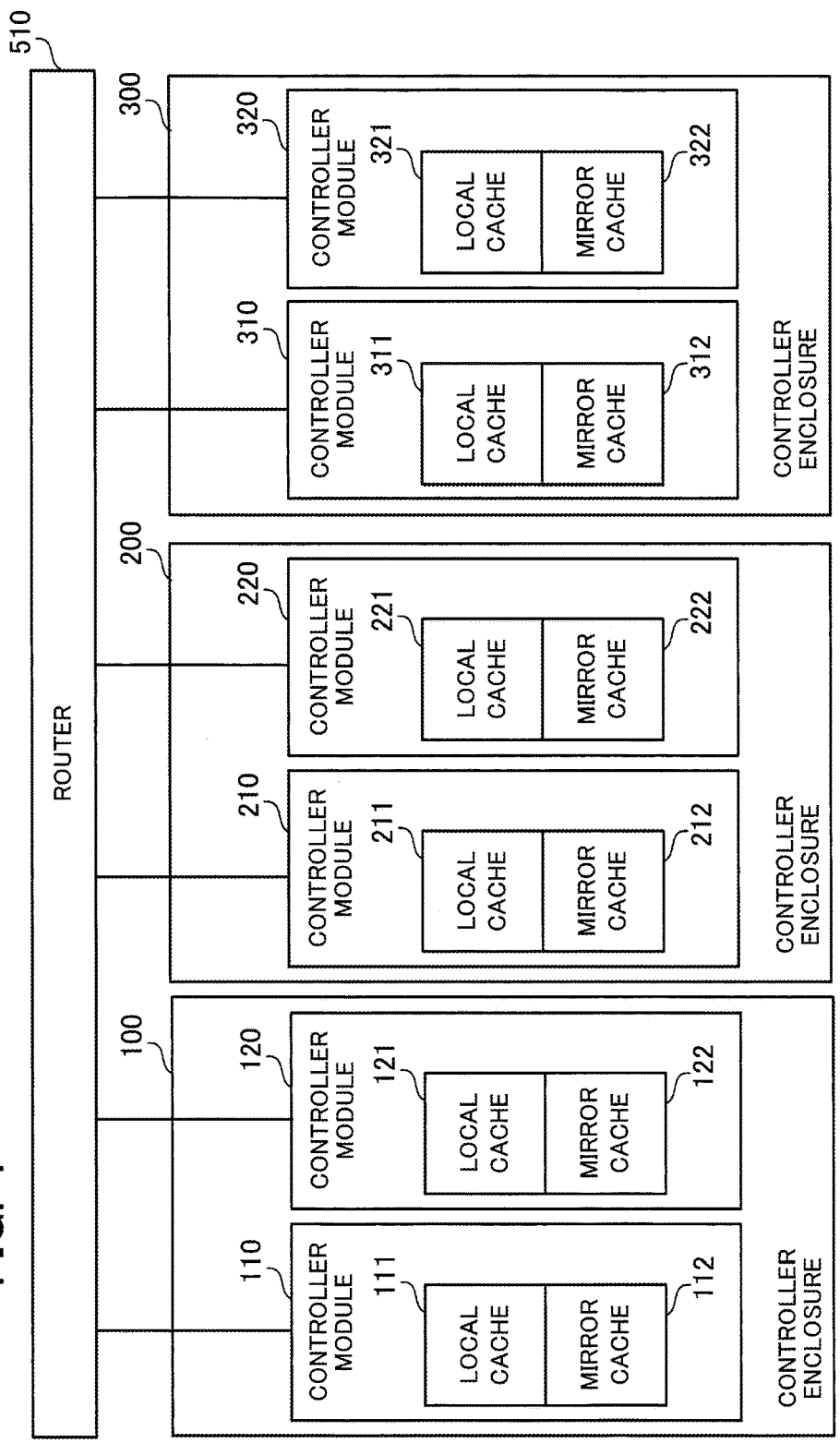
FIG. 4 depicts the relationship between cache regions and regions used for mirroring such cache regions.

FIG. 4 depicts the relationship between cache regions and regions used for mirroring such cache regions. In the storage system according to the present embodiment, reads of data between a controller module and the host apparatus 600 are carried out in units of a logical storage region called a "logical unit". A plurality of logical units are set inside the storage system and each logical unit is assigned a controller module that controls accesses from the host apparatus 600 to such logical unit. Each controller module controls access to the logical units assigned to such controller module using a cache region reserved in the RAM of such controller module. A cache region is reserved for each logical unit in the RAM.

In FIG. 4, to simplify the explanation, it is assumed that the controller modules 110, 120, 210, 220, 310, and 320 each control access to a single logical volume in accordance with access requests from the host apparatus 600. For this reason, one cache region (hereinafter "local cache") is reserved in the RAM of each of the controller modules 110, 120, 210, 220, 310, and 320.

The physical storage region corresponding to the logical unit subject to access control by a given controller module is realized by one or more HDDs mounted in the device enclosures 410, 420, and 430. In the simplest example, the physical region corresponding to a logical unit subject to access control by a given controller module is realized by one or more HDDs in a drive enclosure connected to such controller module. As one example, one or more HDDs in the device enclosure 410 are assigned as the physical storage region corresponding to the logical unit subject to access control by the controller module 110. Normally, a plurality of HDDs are assigned to one LU, and data write to such HDDs are controlled according to RAID (Redundant Arrays of Inexpensive Disks).

As depicted in FIG. 4, at the controller module 110, a local cache 111 and a mirror cache 112 are implemented in a storage region reserved in the RAM 102. At the controller module 120, a local cache 121 and a mirror cache 122 are implemented in a storage region reserved in the RAM of the controller module 120. At the controller module 210, a local cache 211 and a mirror cache 212 are implemented in a storage region reserved in the RAM of the controller module 210. At the controller module 220, a local cache 221 and a mirror cache 222 are implemented in a storage region reserved in the RAM of the controller module 220. At the controller module 310, a local cache 311 and a mirror cache 312 are implemented in a storage region reserved in the RAM of the controller module 310. At the controller module 320, a local cache 321 and a mirror cache 322 are implemented in a storage region reserved in the RAM of the controller module 320.

The local cache is used as a cache region when the corresponding controller module accesses a logical unit subject to access control by such controller module in accordance with a request from the host apparatus 600. As one example, the controller module 110 controls access to a logical unit in accordance with a request from the host apparatus 600 using the local cache 111 as a cache region. In the same way, the controller module 210 controls access to a logical unit in accordance with a request from the host apparatus 600 using the local cache 211 as a cache region.

Mirror data for a different local cache is stored in a mirror cache. As one example, the controller module 110 mirrors the data stored in the local cache 111 in the mirror cache 212 of the controller module 210. The controller module 210 mirrors the data stored in the local cache 211 in the mirror cache 312 of the controller module 310. The controller module 310 mirrors the data stored in the local cache 311 in the mirror cache 122 of the controller module 120. The controller module 120 mirrors the data stored in the local cache 121 in the mirror cache 222 of the controller module 220. The controller module 220 mirrors the data stored in the local cache 221 in the mirror cache 322 of the controller module 320. The controller module 320 mirrors the data stored in the local cache 321 in the mirror cache 112 of the controller module 110.

In this way, the local caches of controller modules are cyclically mirrored in controller modules in adjacent controller enclosures. However, the local cache of a given controller module will definitely be mirrored by a controller module inside a controller enclosure that differs to the controller enclosure in which the given controller module is mounted. By using this configuration, even when operation stops in units of a controller enclosure, it is ensured that at least one of the original data and mirror data will not be lost for any of the local caches.

As one example, it would be conceivable to mirror the local cache 111 of the controller module 110 in the mirror cache 122 of the controller module 120. With this configuration however, when the operation of the controller enclosure 100 stops, both the data stored in the local cache 111 and the mirror data stored in the mirror cache 122 are lost. On the other hand, with the example in FIG. 4, the local cache 111 of the controller module 110 is mirrored in the mirror cache 212 of the controller module 210. This means that even when the operation of the controller enclosure 100 stops, the mirror data of the mirror cache 212 will definitely remain and conversely even when the operation of the controller enclosure 200 stops, the original data in the local cache 111 will definitely remain.

Figure 5:
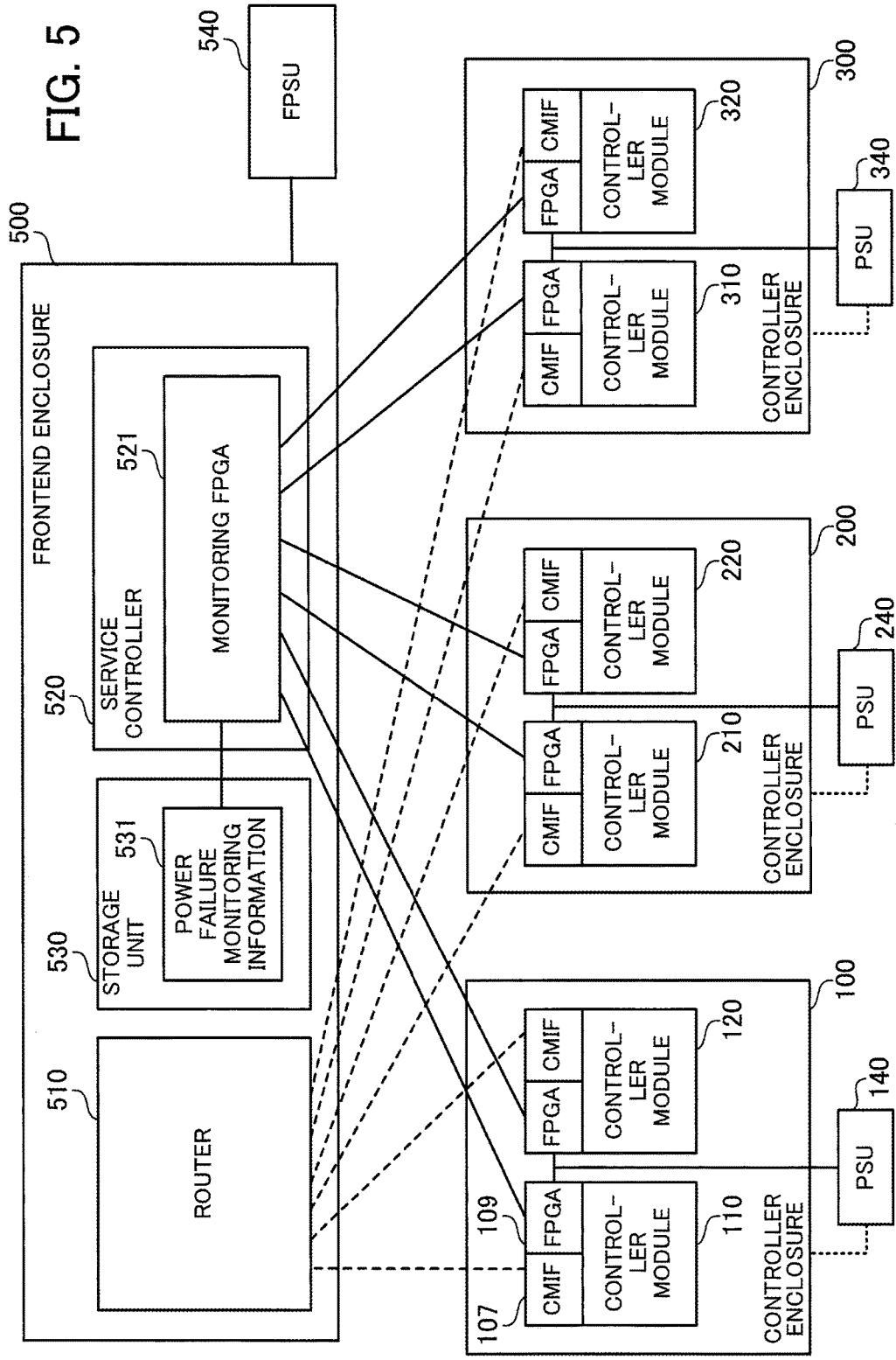
FIG. 5 depicts example monitoring functions of a controller module and a frontend enclosure.

FIG. 5 depicts example monitoring functions of a controller module and a frontend enclosure. Note that the PSU 140 is depicted on the outside of the controller enclosure 100 in FIG. 5 to illustrate that the PSU 140 supplies power to the entire controller enclosure 100, in reality the PSU 140 is mounted inside the controller enclosure 100. The PSUs 240 and 340 are installed inside the controller enclosures 200 and 300 respectively in the same way.

The controller module 110 includes the controller module interface 107 and the FPGA 109. In the same way, the controller modules 120, 210, 220, 310, and 320 each include a controller module interface and an FPGA. On the other hand, in the frontend enclosure 500, the service controller 520 includes a monitoring FPGA 521 that communicates with the FPGA of the respective controller modules that include the FPGA 109. The monitoring FPGA 521 collects power failure information of the controller modules. The storage unit 530 of the frontend enclosure 500 stores power failure monitoring information 531 in which the power failure information collected by the monitoring FPGA 521 from the controller modules is gathered together. As one example, a region for registering a power failure flag indicating whether a power failure has occurred is provided for each controller module in the power failure monitoring information 531.

The controller module interface 107 is an interface for the router 510 of the frontend enclosure 500 and communicates via the router 510 with other controller modules that are connected in the same way to the router 510. By transmitting a monitoring command to other controller modules via the controller module interface 107 and the router 510, the CPU 101 of the controller module 110 confirms whether the other controller modules are down.

As one example, a monitoring command transmitted by the controller module 110 via the controller module interface 107 to the controller module 120 is sent via the router 510 to the controller module 120. When a reply is sent back from the controller module 120, the reply is received via the router 510. When a reply has been received, the controller module 110 determines that the controller module 120 is operating. On the other hand, when a reply has not been sent back within a certain period, the controller module 110 detects a time out. The controller module 110 records a total score corresponding to the number of times a timeout has been detected for each controller module that is being communicated with. When a time out has been detected for the controller module 120, the controller module 110 determines an error for the controller module 120 and increments the total score corresponding to the controller module 120 being communicated with. When a plurality of time outs for the controller module 120 have been detected in this way and the total score has exceeded a threshold, the controller module 110 determines that the controller module 120 has gone down. The controller module 110 executes control that cuts off the controller module determined to have gone down and control for recovering or shutting down such controller module.

Note that one out of the plurality of the controller modules 110, 120, 210, 220, 310, and 320 is set as a master controller module. Control that cuts off and recovers or shuts down a controller module that has gone down is executed by the master controller module. However, at least one controller module aside from the master controller module determines whether other controller modules have gone down in the same way as the master CM. When the master controller module goes down, a predetermined other controller module that determines whether other controller modules have gone down becomes the master controller module and executes control that cuts off and recovers or shuts down a controller module that has gone down. The plurality of controller modules, including the master controller module, that determine whether a controller module has gone down share the total scores indicating the total number of time outs detected for the respective controller modules.

The FPGA 109 monitors the state signal of the PSU 140 that supplies power to the controller module 110. When a power failure is detected from the state signal of the PSU 140, the FPGA 109 executes a "power failure process" that creates a data image of the RAM 102 of the controller module 110 in the backup drive 108 and shuts down the controller module 110 after the image has been completed. By executing this power failure process, it is possible to prevent data loss of the cache data, the mirror cache data, or the like stored in the RAM 102 when a power failure occurs.

The FPGA provided in the controller modules 120, 210, 220, 310, and 320 are equipped with the same functions as the FPGA 109.

However, aside from a "power failure" where the supplying of power by the corresponding PSU stops, it is also possible for the controller modules 110, 120, 210, 220, 310, and 320 to go down due to a "software error". A software error is caused by inconsistent data being inputted into a CPU or the like. It is sometimes possible to recover a controller module that has gone down due to a software error by restarting.

As one example, when the controller module 210 has gone down due to a software error, it may be possible to recover the controller module 210 by having the controller module 210 restarted by another master controller module. However, the data in the memory of the controller module 210 will be lost by restarting. For this reason, by copying data from the mirror cache 312 of the controller module 310 into the local cache 211, the controller module 210 restarts an access control process using the local cache 211. Also, by copying the data in the local cache 111 of the controller module 110 into the mirror cache 212 of the controller module 210, the data of the local cache 111 is placed back in the duplicated state.

"Machine recovery" is another method of recovering a controller module that has gone down due to a software error. Machine recovery is a method where a controller module restarts in a state where the content of the memory is held. Machine recovery is executed by control by the FPGA of the controller module that has gone down when the FPGA of such controller module has received a machine recovery execution instruction from another controller module via the service controller 520.

Machine recovery is effective when two controller modules that are in a mirroring relationship where the data in the local cache of one module is mirrored in the other module have gone down due to software errors. As one example, consider a case where the controller modules 110 and 210 have both gone down due to software errors. In this case, when both controller modules 110 and 210 are simply restarted, the local cache 111 of the controller module 110 and the mirror cache 212 of the controller module 210 would both be lost and it would not be possible to restore the controller module 110 to the previous state. On the other hand, by executing machine recovery at both controller modules 110 and 210, it is possible to restart the operations of the controller modules 110 and 210 in a state where data remains in both the local cache 111 of the controller module 110 and the mirror cache 212 of the controller module 210. When both the local cache 111 and the mirror cache 212 remain, it is possible for the controller module 110 whose operations have restarted to immediately perform access control using the local cache 111 in a state where the data in the local cache 111 is duplicated.

However, in order to have two controller modules in a mirroring state recover by way of a machine recovery, it is necessary to correctly determine whether the respective controller modules have gone down due to software errors and not power failures. This is because it is impossible to restart a controller module that has gone down due to a power failure and impossible for another controller module to soon make use of the data in the local cache and the mirror cache in such controller module. Also, when a controller module that has gone down due to a power failure is instructed to perform a machine recovery, there is a high probability of data stored in the RAM of such controller module being lost due to machine recovery being executed without the FPGA of the controller module that has gone down executing the power failure process described earlier.

The monitoring process described earlier that detects whether a controller module has gone down by transmitting a monitoring command between controller modules is capable of detecting that a controller module has gone down but cannot specify the cause of the controller module going down. This results in the problem that monitoring results which use a monitoring command carry a risk that it will not be possible for a controller module to correctly recover by way of a machine recovery.

In response to such problem, the present embodiment uses an arrangement where information on a controller module (or controller enclosure) where a power failure has occurred is registered in the power failure monitoring information 531 and such power failure monitoring information 531 is referred to by a master controller module that has detected that another controller module has gone down.

As one example, on detecting a power failure from the state signal of the PSU 140, the FPGA 109 of the controller module 110 informs the monitoring FPGA 521 of the occurrence of a power failure. The monitoring FPGA 521 sets a power failure flag in a region corresponding to the controller module 110 in the power failure monitoring information 531. On detecting from the state signal of the PSU 140 that the PSU 140 is normal, the FPGA 109 notifies the monitoring FPGA 521 that the power supply is normal. The monitoring FPGA 521 resets the power failure flag of the region corresponding to the controller module 110 in the power failure monitoring information 531. Note that although the controller module 110 and the controller module 120 share the PSU 140, judgments on state of the PSU 140 are performed by separate FPGA. The monitoring FPGA 521 registers power failure information for each controller module in the power failure monitoring information 531. The same processing is performed for the FPGA of other controller modules. By doing so, power failure information is registered for each controller module in the power failure monitoring information 531.

On detecting that another controller module has gone down, the master controller module requests the power failure information for such controller module 110 from the monitoring FPGA 521. Based on the power failure flag for the controller module in question in the power failure monitoring information 531, the monitoring FPGA 521 transmits power failure information indicating a power failure for the controller module in question to the FPGA 109 of the master controller module. Based on the received power failure information, the master controller module is capable of determining whether the controller module that has gone down went down due to a power failure. In this way, by accurately determining the cause of a controller module going down, it is possible for the master controller module to instruct the controller module that went down to execute an appropriate process in keeping with the determined cause. Accordingly, there is a reduced risk of data in the local cache and mirror cache of a controller module that has gone down due to a software error being lost. There is also a higher probability that a controller module that has gone down due to a software error can be recovered in a short time in a state where the local cache of such controller module is duplicated.

Note that the monitoring FPGA 521 is also equipped with a function for monitoring the state signal of a power supply (FPSU) 540 of the frontend enclosure 500 and determining a power failure for the FPSU 540. When a power failure has been detected for the FPSU 540, the monitoring FPGA 521 notifies the controller modules 110, 120, 210, 220, 310, and 320 via FPGA communication of the power failure at the frontend enclosure 500.

Figure 6:
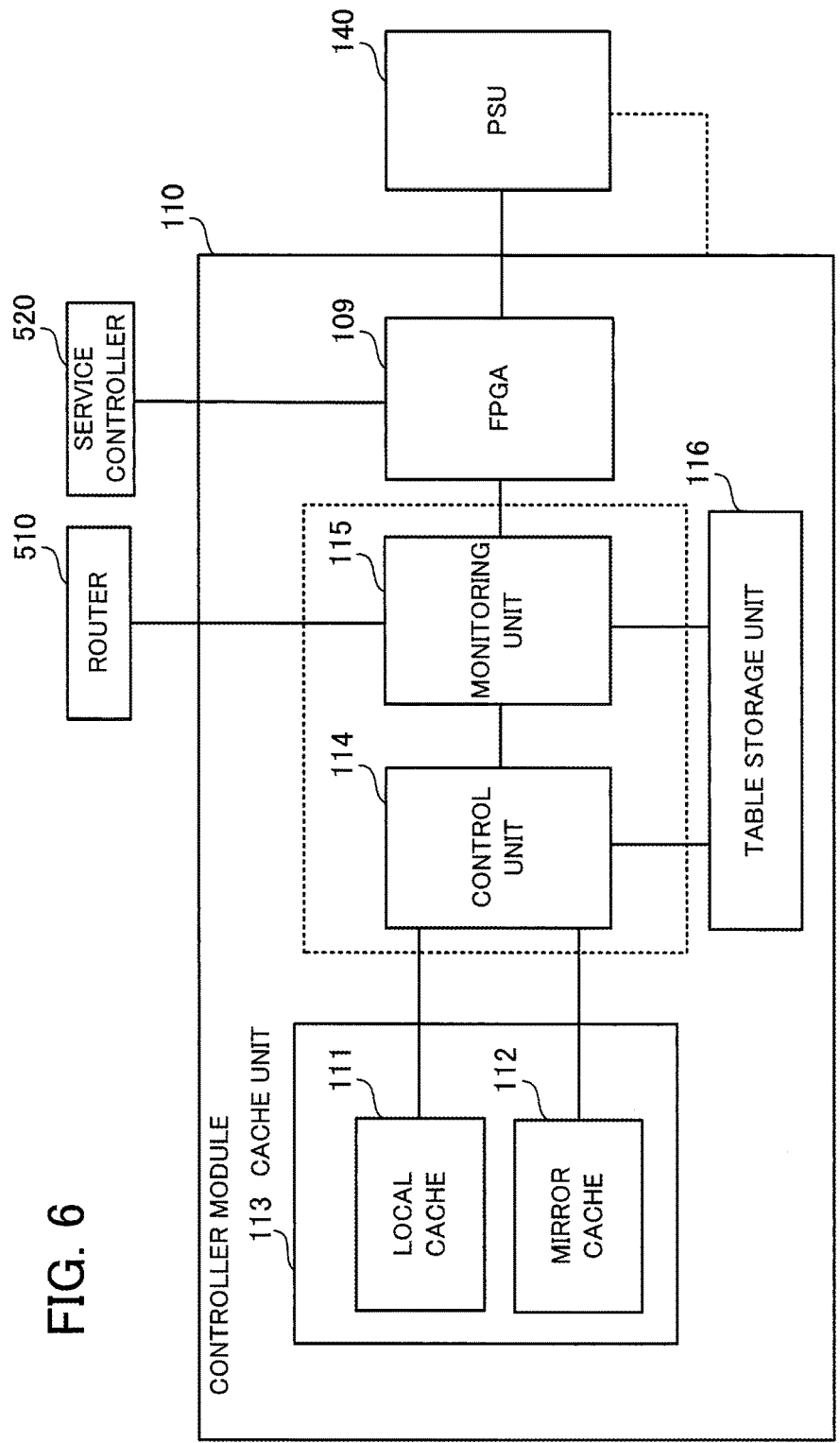
FIG. 6 is a block diagram depicting example functions of a controller module.

FIG. 6 is a block diagram depicting example functions of a controller module. The controller module 110 includes a cache unit 113 that includes the local cache 111 and the mirror cache 112, a control unit 114, a monitoring unit 115, a table storage unit 116, and the FPGA 109. The cache unit 113 is implemented in a predetermined storage region of the RAM 102. The control unit 114 and the monitoring unit 115 are implemented for example as program modules executed by the processor 101. The table storage unit 116 is implemented for example as a storage region reserved in the RAM 102 or the SSD 103.

In accordance with an access request from the host apparatus 600, the control unit 114 controls access to a logical unit which is the access destination of the access request while using the local cache 111. When new write data is stored in the local cache 111, the control unit 114 requests the controller module 210 to store a copy of such write data in the mirror cache 212. By doing so, the local cache 111 is mirrored using the mirror cache 212. Also, in accordance with a request from the controller module 320, the control unit 114 also stores a copy of the write data stored in the local cache 321 of the controller module 320 in the mirror cache 112.

The monitoring unit 115 executes a monitoring process for other controller modules by transmitting a monitoring command. When the controller module 110 is the master controller module, the monitoring unit 115 cuts off other controller modules that have gone down. The monitoring unit 115 instructs the FPGA 109 to acquire the power failure information of the other controller module that has gone down to have the power failure information acquired. Based on the number of controller modules that have gone down, any mirroring relationships between the controller modules that have gone down, and the causes of the controller modules going down which are determined from the power failure information of such controller modules, the monitoring unit 115 determines the process to be executed by the controller modules that has gone down or by every controller module and gives instructions for execution of the decided process. The process to be executed may be restarting, machine recovery, a virtual power failure process (described later), or the like.

The FPGA 109 detects the occurrence of a power failure and recovery from a power failure based on the state signal of the PSU 140 and notifies the monitoring FPGA 521 of power failure information indicating the detected power failure state. When a power failure of the PSU 140 has been detected, the FPGA 109 executes the power failure process for the controller module 110. Also, in keeping with an instruction from the monitoring unit 115, the FPGA 109 acquires power failure information of another controller module from the service controller 520. In keeping with an instruction that passes from the FPGA of another controller module via a service controller, the FPGA 109 also executes restarting, machine recovery, a virtual power failure process, or the like for the controller module 110.

The table storage unit 116 stores a controller module monitoring table. Information used to determine the process to be executed when a corresponding controller module goes down is registered in the controller module monitoring table for the controller modules 110, 120, 210, 220, 310, and 320.

FIG. 7 depicts an example of the controller module monitoring table. The controller module monitoring table 116a is stored in the table storage unit 116.

The state of each controller module in the storage system that has been detected by the monitoring unit 115 is registered in the controller module monitoring table 116a. Information identifying each of the controller modules 110, 120, 210, 220, 310, and 320 is registered in the "CM" column of the controller module monitoring table 116a. In the example in FIG. 7, the controller modules are identified using numbers assigned out of convenience to the controller modules. More specifically, "CM01" is assigned to the controller module 110, "CM02" to the controller module 120, "CM03" to the controller module 210, "CM04" to the controller module 220, "CM05" to the controller module 310, and "CM06" to the controller module 320.

The state of each of the controller modules 110, 120, 210, 220, 310, and 320 detected by the monitoring unit 115 is registered in the "State" column, with "Normal" indicating a state where a controller module is operating normally. "Down" meanwhile indicates that communication with such controller module via the router 510 is no longer possible, and indicates a state where a recovery process is to be performed. Note that it is assumed that the state of a controller module that has been cut off after being detected as being "Down" is registered as "Cut off".

Information identifying the controller module where the local cache of the present controller module is mirrored is registered in the "Mirror cache" column. As one example, "CM03" (the controller module 210) is registered as the mirroring destination of the local cache 111 of "CM01" (the controller module 110). One of "Power failure" and "Software error" that has been detected as the cause of a controller module going down based on the power failure monitoring information 531 acquired by the monitoring unit 115 from the service controller 520 is registered in the "Cause" column. A total score produced by summing points added when the monitoring unit 115 transmitted a monitoring command to another controller module but no reply was received is registered in the "Total score" column.

The controller module monitoring table 116a is held by the master controller module and is referred to during a determination of whether another controller module has gone down and during a recovery process carried out when another controller module has gone down. Note that in readiness for a situation where the master controller module that is presently operating goes down and another controller module becomes the master controller module, at least part of the information of the controller module monitoring table 116a may be shared between controller modules. As one example, the master controller module may notify one or more other controller modules of the content of the controller module monitoring table 116a at predetermined intervals.

Figure 8:
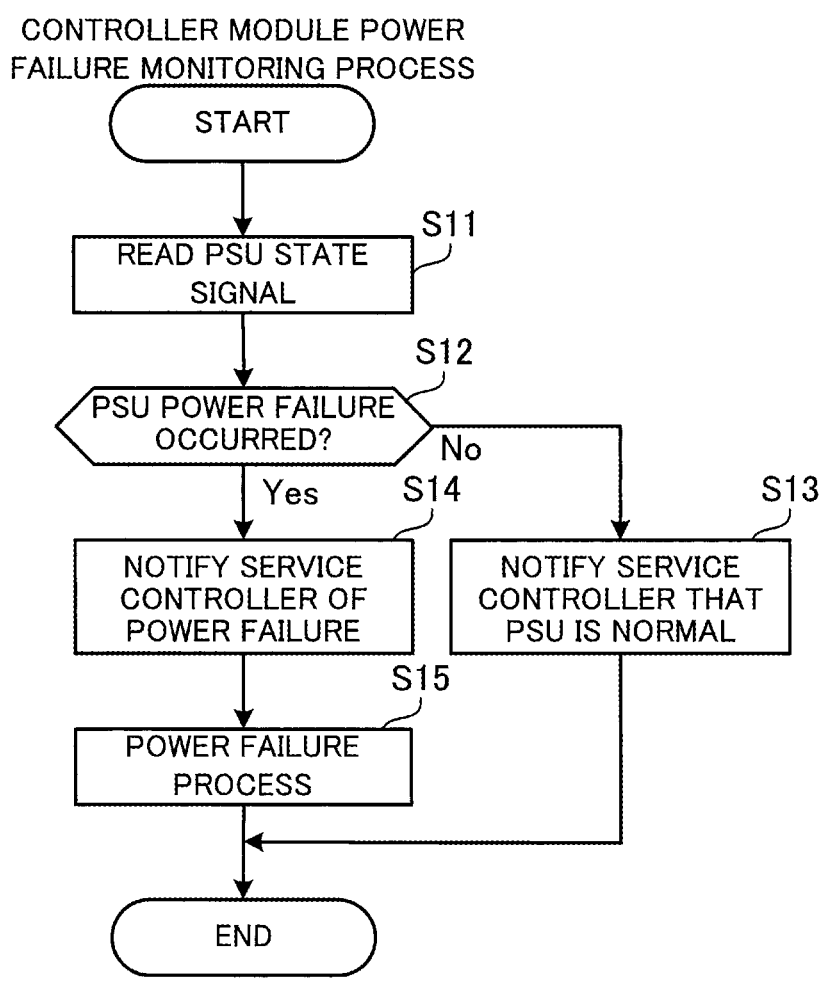
FIG. 8 is a flowchart depicting an example of a power failure monitoring process by a controller module.

FIG. 8 is a flowchart depicting an example of a power failure monitoring process by a controller module. Although this process is executed by every controller module, FIG. 8 depicts a case where the process is executed by the controller module 110. The power failure monitoring process by the controller module 110 is launched at predetermined intervals. The process in FIG. 8 is described below in order of the step numbers.

(S11) When the power failure monitoring process starts, the FPGA 109 reads the state signal of the PSU 140 that is being supplied with power. The state signal indicates whether the PSU 140 is normal or abnormal (power failure).

(S12) The FPGA 109 determines whether a power failure has occurred for the PSU 140 based on the state signal of the PSU 140 read in step S12. When a power failure has occurred, the processing proceeds to step S14, while when a power failure has not occurred, the processing proceeds to step S13.

(S13) Since it has been confirmed that the PSU 140 is normal, the FPGA 109 notifies the monitoring FPGA 521 of the service controller 520 that the PSU 140 is normal. After giving such notification, the FPGA 109 ends the process.

(S14) When a power failure has occurred for the PSU 140, the FPGA 109 notifies the monitoring FPGA 521 of the service controller 520 of a power failure for the PSU 140. The FPGA 109 also notifies the control unit 114 of the occurrence of a power failure.

(S15) The FPGA 109 executes the power failure process. In the power failure process, data stored in the RAM 102 is written for example into the backup drive 108 as a data image to protect cache data and the like. When the write is complete, the FPGA 109 stops operating. By doing so, the controller module 110 shuts down.

In this way, in the controller module 110, the FPGA 109 monitors the PSU 140 and notifies the service controller 520 that manages the power failure monitoring information 153 of a state indicating that the PSU 140 is subject to a power failure or is normal. Note that although the process in FIG. 8 described above is executed at predetermined intervals, when there has been a change in the state signal of the PSU 140 for example, an interrupt may occur for the FPGA 109 and the FPGA 109 may then execute the processing from step S12 onwards.

Figure 9:
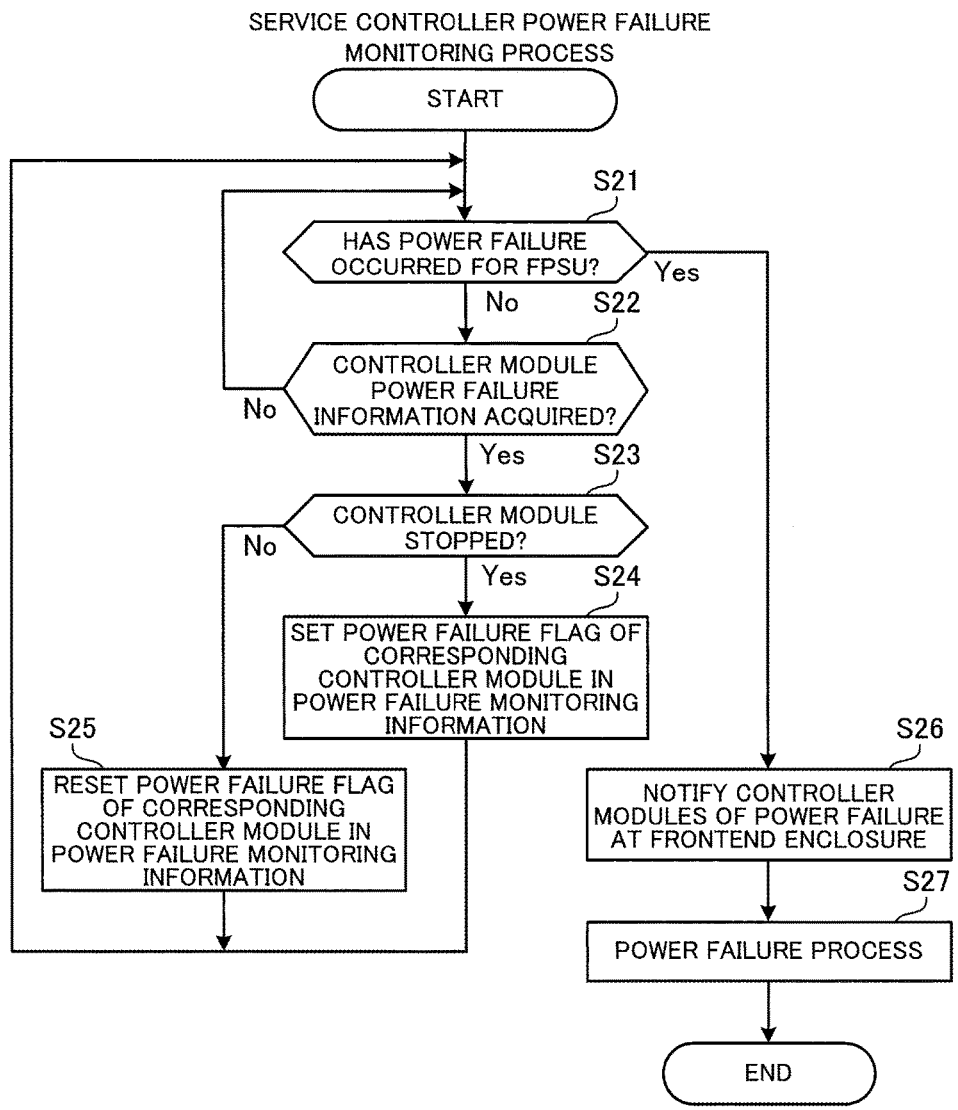
FIG. 9 is a flowchart depicting an example of a power failure monitoring process by a service controller.

FIG. 9 is a flowchart depicting an example of a power failure monitoring process by a service controller. The process in FIG. 9 is described below in order of the step numbers.

(S21) The monitoring FPGA 521 monitors the state signal of the FPSU 540 that supplies power to the frontend enclosure 500 and determines whether a power failure has occurred for the FPSU 540. When a power failure has not occurred, the processing proceeds to step S22, while when a power failure has occurred, the processing proceeds to step S26.

(S22) When the FPSU 540 is operating normally, the service controller 520 performs a monitoring process for the PSUs 140, 240, and 340 of the controller modules 110, 120, 210, 220, 310, and 320. The service controller 520 determines whether power failure information detected for the controller modules 110, 120, 210, 220, 310, and 320 has been acquired via the monitoring FPGA 521. When power failure information has been acquired, the service controller 520 advances the processing to step S23, while when power failure information has not been acquired, the processing returns to step S21.

(S23) The service controller 520 determines, based on the acquired power failure information, whether a power failure has occurred for the controller module that transmitted the power failure information. When a power failure has occurred for the controller module, the processing proceeds to step S24 while when a power failure has not occurred for the controller module, the processing proceeds to step S25.

(S24) Since notification of a power failure has been received from a controller module, the service controller 520 sets a power failure flag corresponding to such controller module in the power failure monitoring information 531 and the processing returns to step S21.

(S25) Since notification indicating normal has been received from a controller module, the service controller 520 resets a power failure flag corresponding to such controller module in the power failure monitoring information 531 and the processing returns to step S21.

(S26) Since a power failure has occurred for the FPSU 540, the service controller 520 notifies every controller module 110, 120, 210, 220, 310, and 320 of the power failure of the frontend enclosure 500 via FPGA communication.

(S27) Since a power failure has occurred for the FPSU 540, the service controller 520 executes the power failure process and then stops operating.

According to the processing described above, a power failure state detected by the controller modules 110, 120, 210, 220, 310, and 320 is registered in the power failure monitoring information 531 at the frontend enclosure 500. By sending a request as necessary to the service controller 520, it is possible for the master controller module to acquire the power failure state of a target controller module that is registered in the power failure monitoring information 531. Note that when notification of a power failure for the frontend enclosure has been received, the controller modules 110, 120, 210, 220, 310, and 320 perform the power failure process and then stop operating. Note that although a check as to whether power failure information has been acquired from a controller module is performed in the service controller power failure monitoring process in the flowchart depicted in FIG. 9, the processing is not limited to such. For example, an interrupt may be produced for the service controller 520 when power failure information is acquired and the processing when power failure information has been acquired may be performed by an interrupt process.

Figure 10:
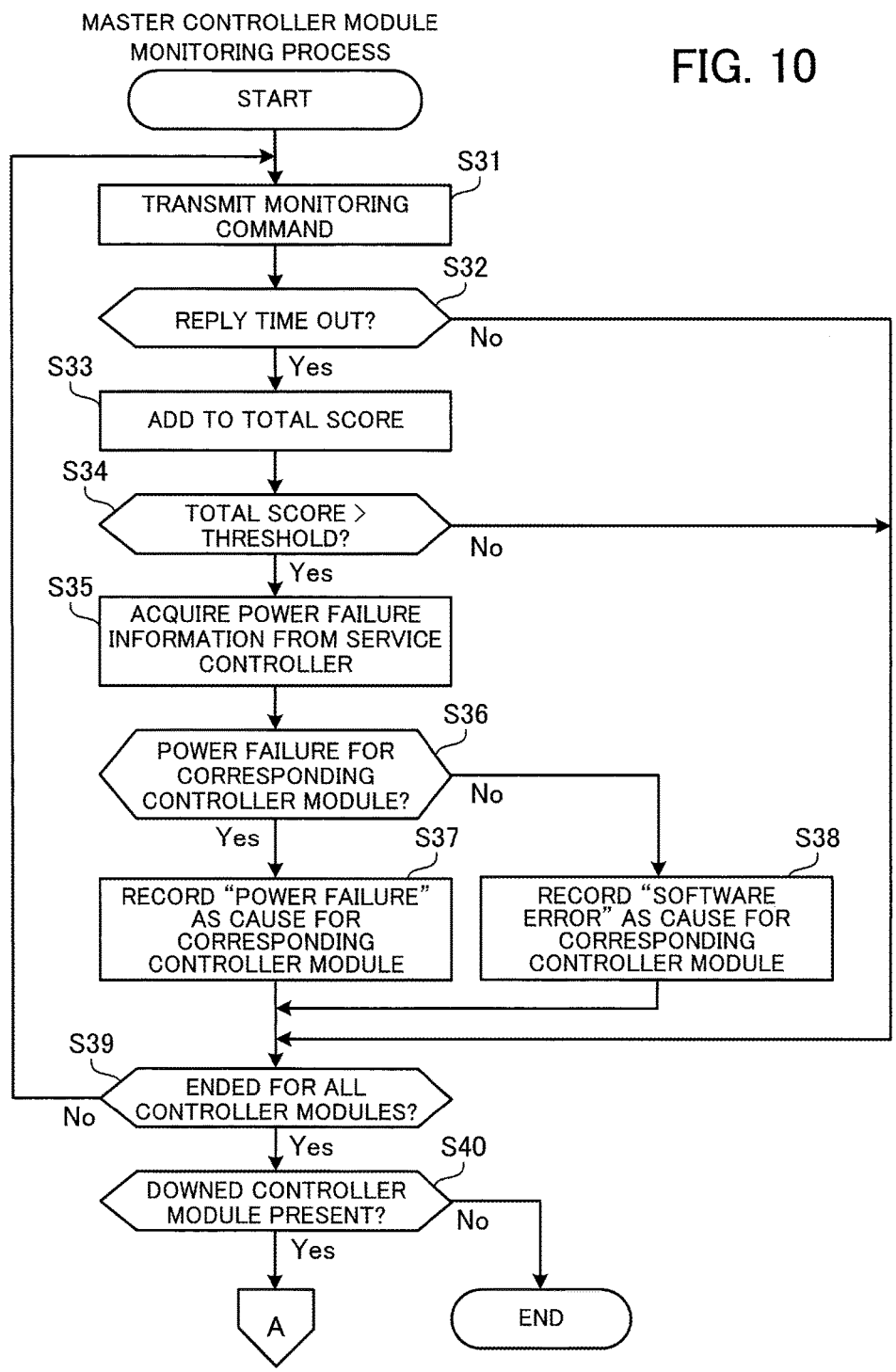
FIG. 10 is a flowchart depicting an example of a monitoring process by a master controller module.

FIG. 10 is a flowchart depicting an example of a monitoring process by the master controller module. In FIG. 10, it is assumed that the controller module 110 is set as the master controller module. The processing in FIG. 10 is executed at intervals of a predetermined time. The processing in FIG. 10 is described below in order of the step numbers.

(S31) The monitoring unit 115 of the master controller module 110 selects a target controller module out of the other controller modules and transmits a monitoring command via the router 510 to the selected target controller module.

(S32) The monitoring unit 115 of the master controller module 110 monitors a reply timeout that is a predetermined period where a reply from the target controller module is not obtained. When a reply timeout has occurred, the monitoring unit 115 advances the processing to step S33. When a reply has been obtained, the processing advances to step S39.

(S33) When a reply timeout has been detected, the monitoring unit 115 of the master controller module 110 adds predetermined points to the total score in the controller module monitoring table 116*a* corresponding to the target controller module from which a reply was not received to update the value.

(S34) The monitoring unit 115 of the master controller module 110 compares the updated total score and a threshold decided in advance. When the total score of the target controller module exceeds the threshold, the monitoring unit 115 determines that the target controller module has gone down and advances the processing to step S35. When the total score does not exceed the threshold, the monitoring unit 115 determines that the target controller module is normal and advances the processing to step S39.

(S35) The monitoring unit 115 of the master controller module 110 instructs the FPGA 109 to acquire the power failure information of the target controller module determined to have gone down. The FPGA 109 that receives such instruction requests the power failure information of the target controller module determined to have gone down from the service controller 520. The service controller 520 extracts the power failure information of the target controller module from the power failure monitoring information 531 stored in the storage unit 530 and transmits the power failure information to the master controller module 110. The FPGA 109 passes the received power failure information to the monitoring unit 115.

(S36) The monitoring unit 115 of the master controller module 110 determines, based on the acquired power failure information, whether a power failure has occurred at the target controller module determined to have gone down. When the cause of the target controller module going down is determined to be a power failure, the monitoring unit 115 advances the processing to step S37. When the cause of the target controller module going down is not a power failure, the monitoring unit 115 determines that the cause is a software error and advances the processing to step S38.

(S37) The monitoring unit 115 of the controller module 110 registers "Down" in the "State" column of the controller module monitoring table 116a corresponding to the target controller module determined to be down and registers "Power failure" in the "Cause" column. After this, the monitoring unit 115 advances the processing to step S39.

(S38) The monitoring unit 115 of the master controller module 110 registers "Down" in the "State" column of the controller module monitoring table 116a corresponding to the target controller module determined to be down and registers "Software error" in the "Cause" column.

(S39) The monitoring unit 115 of the master controller module 110 determines whether the down detection process for controller modules carried out by transmitting monitoring commands has ended for every controller module. When the down detection process has ended for every controller module, the monitoring unit 115 advances the processing to step S40. When the down detection process has not ended for every controller module, the monitoring unit 115 sets the target controller module at another controller module for which the detection process has not ended and returns the processing to step S31.

(S40) The monitoring unit 115 of the master controller module 110 refers to the updated controller module monitoring table 116a and determines whether there is a controller module that has been detected to have gone down. When no downed controller module has been detected, the processing ends. When a downed controller module has been detected, the processing proceeds to step S51 in FIG. 11.

By executing the procedure described above, the controller module monitoring table 116a is updated in keeping with the monitoring results. Note that although the total score is calculated in the procedure described above according to the result of the master controller module 110 transmitting monitoring commands, it is also possible for another controller module to transmit monitoring commands in the same way and monitor controller modules aside from itself. As one example, another controller module may calculate the total score according to the result of transmitting monitoring commands and notify the master controller module 320 of the total score. The monitoring unit 115 of the master controller module 110 adds the total score acquired from the other controller module to the total score detected by the controller module 110 itself.

Figure 11:
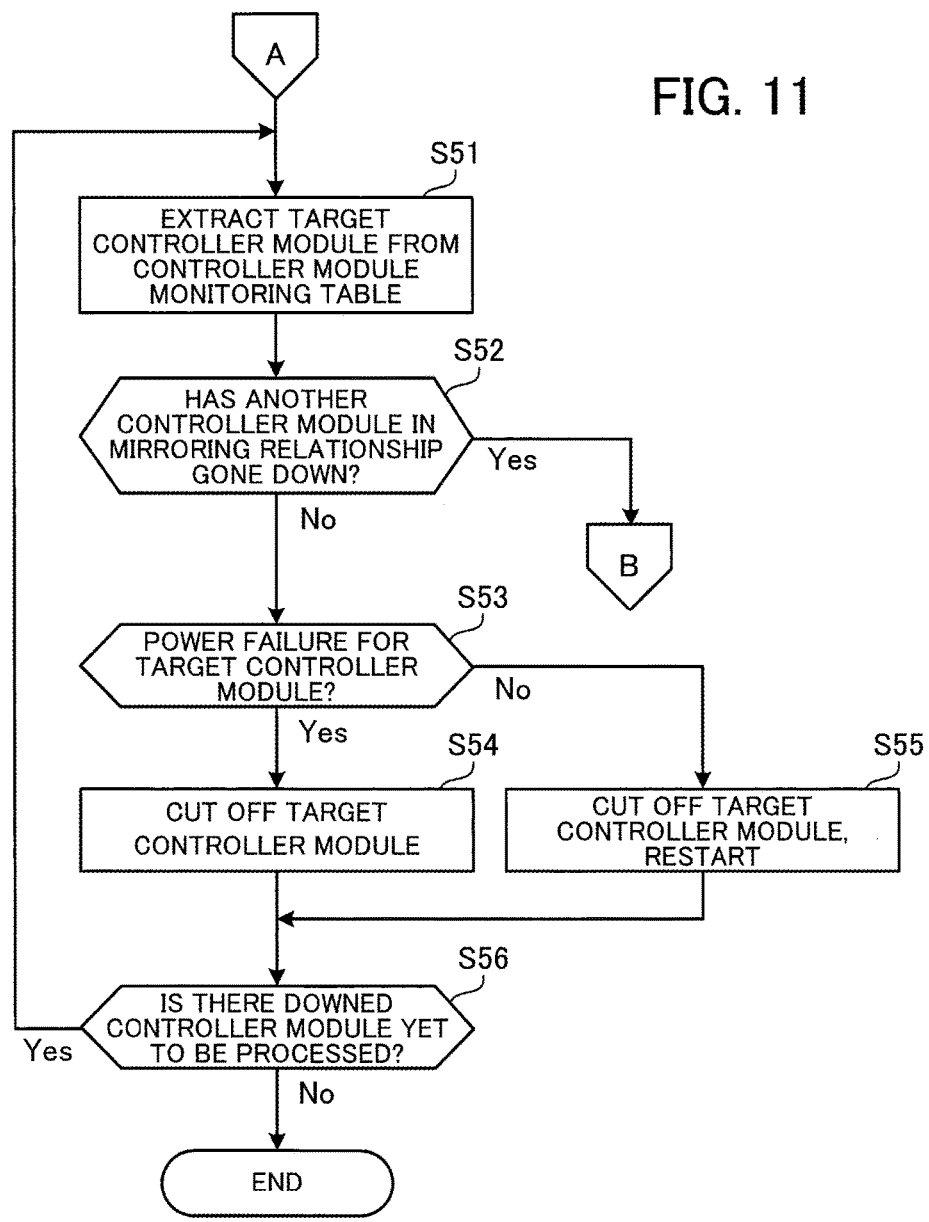
FIG. 11 is a flowchart showing an example of processing when the master controller module has detected that another controller module has gone down.

Next, the processing in a situation where a downed controller module has been detected based on the updated controller module monitoring table 116a will be described. FIG. 11 is a flowchart showing an example of processing when the master controller module has detected that another controller module has gone down. In FIG. 11, like FIG. 10, it is assumed that the controller module 110 is set as the master controller module. The processing in FIG. 11 is described below in order of the step numbers.

(S51) The control unit 114 of the master controller module 110 extracts, based on the controller module monitoring table 116a, information on a controller module whose state is "Down" and that is to be cut off.

(S52) The control unit 114 of the master controller module 110 checks, based on the controller module monitoring table 116a, the State column of other controller modules in a mirroring relationship with the extracted controller module that is the target for cutting off. For example, assuming that the target controller module to be cut off is the controller module 210 (CM03), the controller module 310 (CM05) that is the mirroring destination of the local cache 211 of the controller module 210 is to be checked. The controller module 110 (CM01) that has the local cache 111 in which the original data corresponding to the mirror cache 212 of the controller module 210 is stored is also checked. When at least one other controller module in a mirroring relationship with the target controller module to be cut off has gone down, the control unit 114 advances the processing to step S61 of the flowchart depicted in FIG. 12. When none of the controller modules in a mirroring relationship with the target controller module to be cut off have gone down, the processing proceeds to step S53.

(S53) The control unit 114 of the master controller module 110 specifies, based on the controller module monitoring table 116a, the cause of the target controller module to be cut off going down. When the cause is "power failure", the processing proceeds to step S54. When the cause is not "power failure", that is, when the cause is "software error", the processing proceeds to step S55.

(S54) The control unit 114 of the master controller module 110 registers "Cut off" in the state column corresponding to the target controller module in the controller module monitoring table 116a and cuts off the target controller module that has gone down due to a "power failure" from the storage system.

(S55) The control unit 114 of the master controller module 110 registers "cut off" in the state column corresponding to the target controller module in the controller module monitoring table 116a and cuts off the target controller module that has gone down due to a "software error" from the storage system. The control unit 114 also instructs the FPGA 109 to have the target controller module restarted. The FPGA 109 instructs the FPGA of the target controller module via the service controller 520 to execute a restart.

Note that the target controller module restores the local cache and the mirror cache of the target controller module based on the content of the local cache or mirror cache of other controller modules in a mirroring relationship. When restoring is complete, the target controller module is incorporated back into the system and restarts normal operations.

(S56) The control unit 114 of the master controller module 110 determines whether there is a controller module for which the processing in step S51 onwards has not been performed, out of the controller modules detected as having gone down. When there is a downed controller module that has not been processed, the processing returns to step S51 and the processing described above is repeated. When there is no downed controller module that is yet to be processed, the processing ends.

By executing the above procedure, when no other controller module in a mirroring relationship with the controller module detected as having gone down has also gone down, the controller module detected as down is cut off from the system. Also, a controller module that has gone down due to a software error can be restored by restarting.

Figure 12:
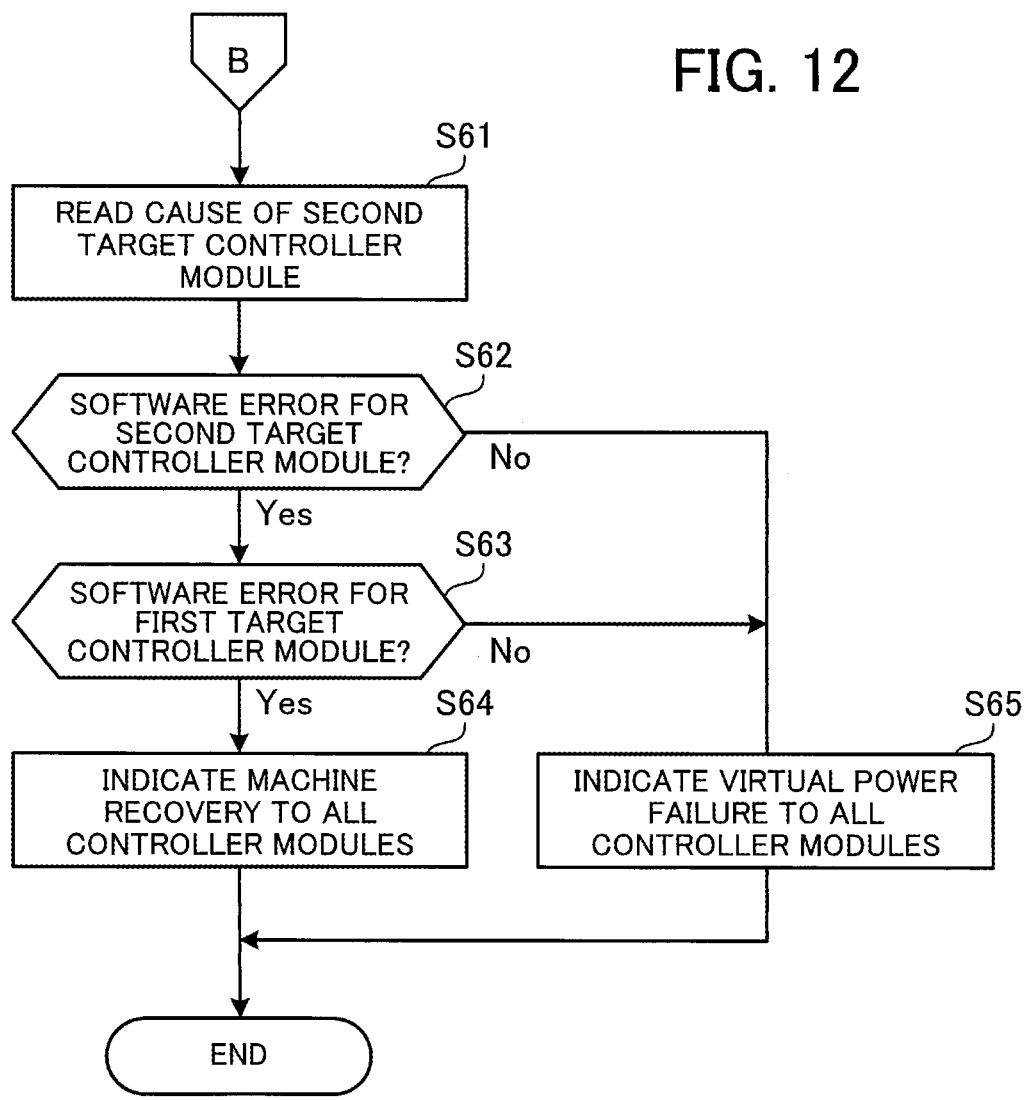
FIG. 12 is a flowchart depicting an example of processing when the master controller module detects that two controller modules in a mirroring relationship have gone down.

Next, the processing when controller modules in a mirroring relationship have both gone down will be described. FIG. 12 is a flowchart depicting an example of processing when the master controller module detects that two controller modules in a mirroring relationship have gone down. In FIG. 12, in the same way as FIGS. 10 and 11, it is assumed that the controller module 110 is set as the master controller module. It is also assumed that according to the processing of the flowchart depicted in FIG. 11, it has been detected that two controller modules in a mirroring relationship have both gone down. For ease of explanation, the two controller modules in a mirroring relationship that have been detected as down are referred to as the "first target controller module" and the "second target controller module". The processing depicted in FIG. 12 is described below in order of the step numbers.

(S61) The control unit 114 of the master controller module 110 reads the cause of the second target controller module going down from the controller module monitoring table 116a. Note that the second target controller module corresponds to the other controller module determined as having gone down in step S52 of FIG. 11.

(S62) The control unit 114 of the master controller module 110 determines whether the cause of the second target controller module going down is a software error. The control unit 114 advances the processing to step S63 when the cause is a software error or to step S65 when the cause is not a software error.

(S63) The control unit 114 of the master controller module 110 determines whether the cause of the first target controller module going down is a software error. The control unit 114 advances the processing to step S64 when the cause is a software error or to step S65 when the cause is not a software error.

(S64) When both the first target controller module and the second target controller module have gone down due to software errors, the control unit 114 of the master controller module 110 has every controller module execute a machine recovery. More specifically, the control unit 114 instructs the FPGA 109 to have every controller module execute a machine recovery. The FPGA 109 instructs all other controller modules via the service controller 520 to execute a machine recovery. Note that controller modules that have not gone down out of the other controller modules may be instructed to execute a machine recovery by the monitoring unit 115 via the router 510.

After instructing all other controller modules to execute a machine recovery, the FPGA 109 has the controller module 110 execute a machine recovery. By doing so, the controller module 110 restarts with the data stored in the RAM 102 being held.

(S65) When the cause of any of the first target controller module and the second target controller module going down is not a software error, the control unit 114 of the master controller module 110 has every controller module execute a virtual power failure process. The expression "virtual power failure process" refers to a controller module with no power failure executing the same process as the power failure process, which is executed when there is a power failure. That is, a controller module instructed to execute a virtual power failure process creates a data image of the RAM in a backup drive and shuts down after the copying is complete.

The control unit 114 instructs the FPGA 109 to have every controller module where there is no power failure, out of the other controller modules, execute a virtual power failure process. The FPGA 109 gives the instruction to execute a virtual power failure process to every controller module where there is no power failure via the service controller 520. Note that it is also possible for the instruction to execute the virtual power failure process to be given by the monitoring unit 115 via the router 510 to every controller module where there is no power failure.

After instructing all of the other controller modules where there is no power failure to execute the virtual power failure process, the FPGA 109 has the controller module 110 execute the virtual power failure process. That is, the FPGA 109 creates a data image of the RAM 102 in the backup drive 108 and stops operating once the copying is complete.

When the first target controller module and the second target controller module in a mirroring relationship have gone down at the same time, by executing the above procedure, it is possible to confirm the respective causes of the modules going down and to perform processing in keeping with the respective causes to protect the data. When the first target controller module and the second target controller module have both gone down due to a software error, the master controller module instructs every controller module to execute a machine recovery so that the controller modules restart in a state where the memory content including the cache regions is held.

By doing so, it is possible to at least increase the probability that both controller modules in a mirroring relationship will restart operating without the data in the local cache and the mirror cache of both controller modules being lost. Also, when a software error has occurred at a plurality of controller modules, there is the possibility of a software error subsequently occurring at other controller modules. For this reason, by having not only the controller modules in a mirroring relationship but also all other controller modules execute a machine recovery, it is possible to prevent a software error from occurring at other controller modules.

On the other hand, when the first target controller module or the second target controller module has gone down due to a power failure, it is possible for only one of the controller modules to recover by way of a machine recovery. This means that only one out of the local cache and the mirror cache in a mirroring relationship can be used immediately and that it is not possible to restart operations with the data in the local cache in a duplicated state. In addition, when the machine recovery for a controller module where there is no power failure is unsuccessful, there is also the risk of both original data and duplicated data being lost.

For this reason, when the first target controller module or the second target controller module has gone down due to a power failure, every controller module where there is no power failure is caused to execute the virtual power failure process. By doing so, it is possible to at least reduce the possibility of data in a local cache and a mirror cache in a mirroring relationship both being lost. Also, when there is a power failure for controller modules in a mirroring relationship, this means that a power failure has occurred for a plurality of controller enclosures. Accordingly, there is also the possibility of a power failure occurring for other controller enclosures. For this reason, by causing the controller modules where there is no power failure to also execute a virtual power failure process, it is possible to prevent the occurrence of power failures and to reduce the possibility of data loss.

Figure 13:
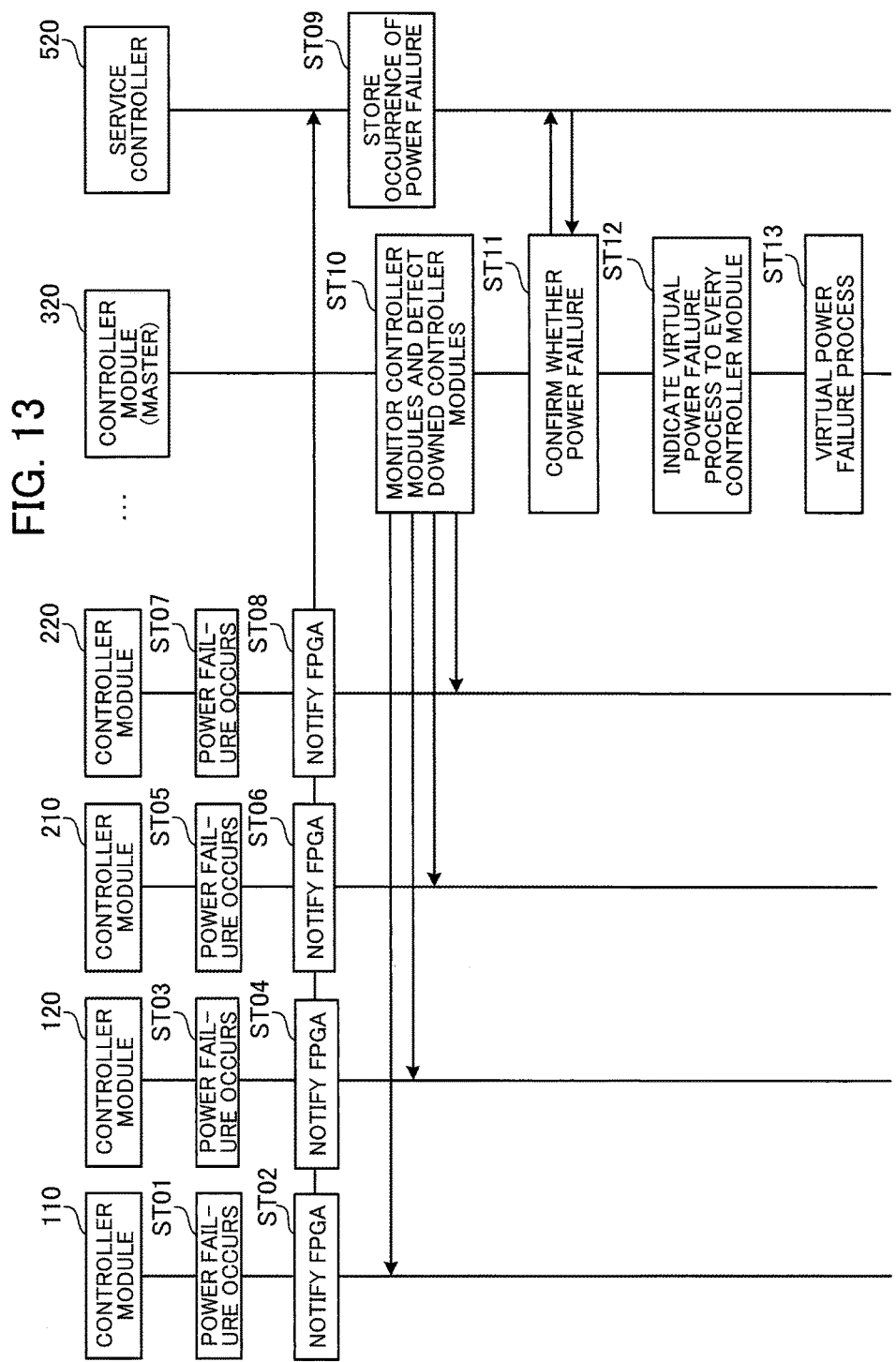
FIG. 13 is a sequence chart depicting an example of processing when a power failure has occurred for both controller modules in a mirroring relationship.

FIG. 13 is a sequence chart depicting an example of processing when a power failure has occurred for both controller modules in a mirroring relationship. In FIG. 13, it is assumed that the controller module 320 is set as the master controller module and that the controller modules 110, 120, 210, and 220 have gone down due to a power failure. The processing depicted in FIG. 13 is described below in order of the step numbers.

(ST01) The PSU 140 of the controller enclosure 100 goes down and a power failure occurs for the controller module 110.

(ST02) The FPGA 109 of the controller module 110 confirms the state signal of the PSU 140 and detects the power failure. The FPGA 109 notifies the service controller 520 of the occurrence of the power failure.

(ST03) The PSU 140 goes down and a power failure occurs for the controller module 120.

(ST04) The FPGA of the controller module 120 confirms the state signal of the PSU 140 and detects a power failure. The FPGA of the controller module 120 notifies the service controller 520 of the occurrence of the power failure.

(ST05) The PSU 340 of the controller enclosure 300 goes down and a power failure occurs for the controller module 210.

(ST06) The FPGA of the controller module 210 confirms the state signal of the PSU 240 and detects a power failure. The FPGA of the controller module 210 notifies the service controller 520 of the occurrence of the power failure.

(ST07) The PSU 240 goes down and a power failure occurs for the controller module 220.

(ST08) The FPGA of the controller module 220 confirms the state signal of the PSU 240 and detects a power failure. The FPGA of the controller module 220 notifies the service controller 520 of the occurrence of the power failure.

(ST09) The monitoring FPGA 521 of the service controller 520 acquires the notifications of the power failures for the controller modules 110, 120, 210, and 220 and registers the power failures of the controller modules that have given such notifications in the power failure monitoring information 531.

(ST10) The controller module 320 of the master controller module transmits a monitoring command to the controller modules 110, 120, 210, and 220 via the router 510 and performs controller module monitoring that detects whether controller modules are down according to whether a reply is received to such monitoring command. Since no reply is obtained from the controller modules 110, 120, 210, and 220, the controller module 320 detects that the controller modules 110, 120, 210, and 220 have gone down.

(ST11) The controller module 320 confirms whether the cause of a controller module detected as having gone down, for example, the controller module 110, going down is a power failure. The controller module 320 requests the power failure information for the controller module 110 from the service controller 520 and acquires, from the service controller 520, the power failure information of the controller module 110 based on the power failure monitoring information 531. In the example in FIG. 13, the controller module 320 is notified that the controller module 110 has gone down due to a power failure.

(ST12) The controller module 320 confirms whether another controller module in a mirroring relationship with the controller module detected as having gone down has also gone down. In the example in FIG. 13, it is confirmed that the controller module 210 that is in a mirroring relationship with the controller module 110 has also gone down due to a power failure. Since the controller module 210 in a mirroring relationship has also gone down due to a power failure, the controller module 320 instructs every controller module to execute a virtual power failure process. Note that in the example of FIG. 13, since the only controller module for which a power failure has not occurred is the controller module 310, the controller module 310 is instructed to execute a virtual power failure process.

(ST13) The controller module 320 itself also executes the virtual power failure process.

Figure 14:
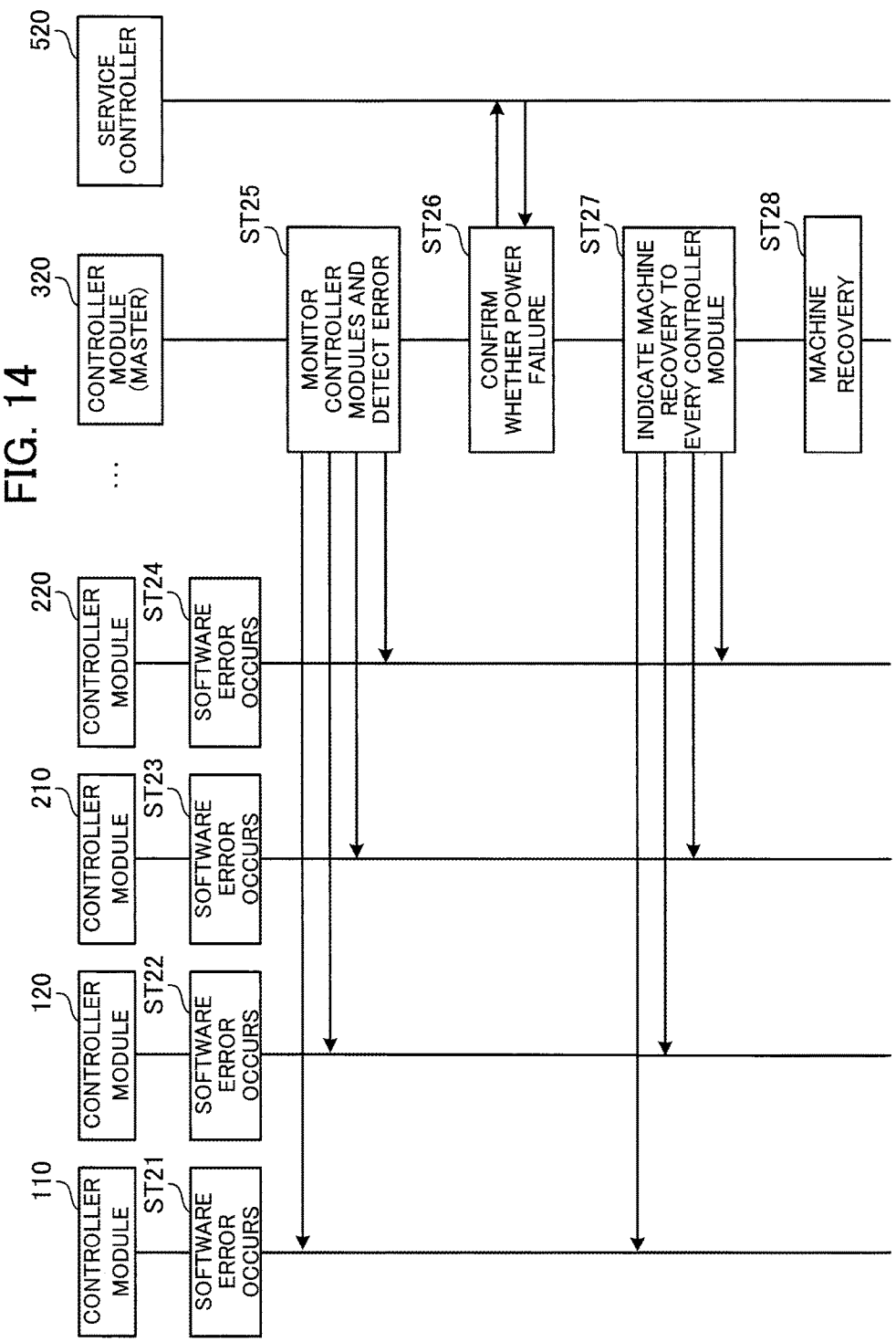
FIG. 14 is a sequence chart depicting an example of processing when controller modules in a mirroring relationship have both gone down due to a software error.

FIG. 14 is a sequence chart depicting an example of processing when controller modules in a mirroring relationship have both gone down due to a software error. In FIG. 14, it is assumed that the controller module 320 is set as the master controller module and the controller modules 110, 120, 210, and 220 have gone down due to a software error. The processing depicted in FIG. 14 is described below in order of the step numbers.

(ST21) A software error occurs for the controller module 110. Since a software error occurs, the controller module 110 is not able to notify the service controller 520 or other controller modules of an error.

(ST22) A software error occurs for the controller module 120. In the same way as above, the controller module 120 is not able to give notification of the error.

(ST23) A software error occurs for the controller module 210. In the same way as above, the controller module 210 is not able to give notification of the error.

(ST24) A software error occurs for the controller module 220. In the same way as above, the controller module 220 is not able to give notification of the error.

(ST25) The controller module 320 that is the master controller module transmits a monitoring command to the controller modules 110, 120, 210, and 220 via the router 510, and carries out controller module monitoring that detects whether controller modules are down according to whether there is a reply to the monitoring command. Since a reply is not obtained from the controller modules 110, 120, 210, and 220, the controller module 320 detects that the controller modules 110, 120, 210, and 220 have gone down.

(ST26) The controller module 320 confirms whether the cause of a controller module detected as having gone down, for example, the controller module 110, going down is a power failure. The controller module 320 requests the power failure information for the controller module 110 from the service controller 520 and acquires, from the service controller 520, the power failure information of the controller module 110 based on the power failure monitoring information 531. In this example in FIG. 14, the controller module 320 is notified that a power failure has not occurred at the controller module 110. Accordingly, the controller module 320 determines that a software error has occurred for the controller module 110.

(ST27) The controller module 320 confirms whether another controller module in a mirroring relationship with the controller module detected as having gone down has also gone down. In the example in FIG. 14, it is confirmed that the controller module 210 in a mirroring relationship with the controller module 110 has also gone down due to a software error. Since the controller module 210 in a mirroring relationship has also gone down due to a software error, the controller module 320 instructs all other controller module to execute a machine recovery.

(ST28) The controller module 320 itself executes a machine recovery.

In this way, when two controller modules in a mirroring relationship have gone down at the same time and the cause for both modules is a software error, the master controller module instructs every controller module to execute a machine recovery. By doing so, it is possible to increase the probability of performing a recovery where the cache data of the controller modules where a software error has occurred is still held.

FIG. 15 is a flowchart depicting an example recovery process at a controller module that executes machine recovery due to the occurrence of a software error. Like the example in FIG. 14, FIG. 15 depicts the processing by the controller module 110 when a software error occurs at the controller modules 110 and 210 that are in a mirroring relationship and the controller modules 110 and 210 have performed a machine recovery in keeping with such software error. The processing depicted in FIG. 15 is described below in order of the step numbers.

(S71) The controller module 110 restarts and the processing of the monitoring unit 115 is restarted.

(S72) Based on the controller module monitoring table 116a, the monitoring unit 115 specifies the controller module 210 as the controller module that is the mirroring destination of the local cache 111 of the controller module 110. The monitoring unit 115 requests the controller module 210 to read the data in the mirror cache 212 of the controller module 210. The monitoring unit 115 cross-checks the data read from the mirror cache 212 against the data stored in the local cache 111 and confirms whether the data is consistent.

(S73) The monitoring unit 115 determines whether the data is consistent. When the data is consistent, the processing proceeds to step S74, while when the data is not consistent, the processing proceeds to step S76.

(S74) Based on the controller module monitoring table 116a, the monitoring unit 115 specifies the controller module 310 as the controller module storing the original data for the mirror cache 112 of the controller module 110. The monitoring unit 115 requests the controller module 310 to read the data in the local cache 311 of the controller module 310. The monitoring unit 115 writes the data read from the local cache 311 into the mirror cache 112 to restore the data in the mirror cache 112.

(S75) The monitoring unit 115 restarts the operation of the controller module 110. That is, access control to logical units by the control unit 114 is restarted.

(S76) When the data is not consistent, there is the possibility that machine recovery at the controller module 110 was unsuccessful. In this scenario, the monitoring unit 115 notifies another apparatus (for example, the service controller 520) that an error that prevents operations from continuing has occurred at the controller module 110.

(S77) The monitoring unit 115 shuts down the controller module 110.

In this way, a controller module where a software error has occurred and a machine recovery has been executed cross-checks its own local cache with data at the mirroring destination and restarts normal operations only when the data is consistent. By doing so, it is possible for the operations of a controller module that has correctly recovered to start quickly and it is possible to improve reliability while reducing the recovery time.

Note that the information processing in the first embodiment can be realized by having processors used in the information processing apparatuses 10, 20 and 30 execute a program. Likewise, the information processing in the second embodiment can be realized by having the processor 101 in the controller module 110 and processors in the controller modules 120, 210, 220, 310, and 320 execute a program. Such programs can be recorded on a computer-readable recording medium.

As one example, it is possible to distribute a program by distributing a recording medium on which the program is recorded. It is also possible to produce a program that realizes functions corresponding to the control unit of the control unit 114 of the controller module 110 and the control units of the controller modules 120, 210, 220, 310, and 320 as a separate program and to separately distribute the programs. The functions of the control unit 114 of the controller module 110 and the control units of the controller modules 120, 210, 220, 310, and 320 may also be realized by separate computers. As one example, a computer may read out a program recorded on a recording medium, store (install) the program in the RAM 102 or the SSD 103, and execute the program by reading out the program from such storage medium.

According to the above embodiments, it is possible to reduce the probability of data loss during recovery of an information processing apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing system comprising:
a first information processing apparatus including a first memory with a cache region, a first power supply that supplies power to the first memory, and a first processor that outputs, upon detecting a power failure of the first power supply, a first power failure signal;
a second information processing apparatus including a second memory with a mirror cache region that stores mirror data for data stored in the cache region, a second power supply that supplies power to the second memory, and a second processor that outputs, upon detecting a power failure of the second power supply, a second power failure signal; and
a third information processing apparatus that executes a process for monitoring operations of the first information processing apparatus and the second information processing apparatus by communicating with the first information processing apparatus and the second information processing apparatus, determining, upon detecting that the operations have stopped at both the first information processing apparatus and the second information processing apparatus, whether there is a power failure state at the first information processing apparatus and the second information processing apparatus based on presence of the first power failure signal and presence of the second power failure signal respectively for determination as to whether the first information processing apparatus is stopped due to the power failure of the first power supply and whether the second information processing apparatus is stopped due to the power failure of the second power supply, and, when there is no power failure at the first information processing apparatus and there is no power failure at the second information processing apparatus, restarting the first information processing apparatus in a state where data of the first memory is held and restarting the second information processing apparatus in a state where data of the second memory is held.

2. The information processing system according to claim 1, further comprising a monitoring device that stores, in a storage device, power failure monitoring information indicating apparatuses where there is a power failure based on the presence of the first power failure signal and the presence of the second power failure signal,
wherein the third information processing apparatus determines the power failure states of the first information processing apparatus and the second information processing apparatus based on the power failure monitoring information.

3. The information processing system according to claim 1, wherein upon determining a power failure for the first information processing apparatus but no power failure for the second information processing apparatus, the third information processing apparatus instructs the second information processing apparatus to execute a power failure process executed when there is a power failure.

4. The information processing system according to claim 3, wherein the second information processing apparatus further includes a nonvolatile storage apparatus for backing up the second memory, and
in accordance with an instruction to execute the power failure process, the second processor transfers data stored in the second memory to the nonvolatile storage apparatus and then has the second power supply stop supplying power.

5. The information processing system according to claim 1, wherein the first information processing apparatus further includes a third processor that cross-checks, after the first information processing apparatus has restarted in a state where memory is held in the first memory, data stored in the cache region and data stored in the mirror cache and, when the cross-checking is successful, starts an access control process for a predetermined storage apparatus using the cache region.

6. The information processing system according to claim 1, wherein the third information processing apparatus transmits a first monitoring signal to the first information processing apparatus and determines whether the first information processing apparatus is operating based on whether there is a reply to the first monitoring signal, and transmits a second monitoring signal to the second information processing apparatus and determines whether the second information processing apparatus is operating based on whether there is a reply to the second monitoring signal.

7. A control apparatus comprising:
an interface that communicates with a first information processing apparatus, which includes a first memory with a cache region, and a second information processing apparatus, which includes a second memory with a mirror cache that stores mirror data for data stored in the cache region; and
a processor performing a procedure including
executing a process for monitoring operations of the first information processing apparatus and the second information processing apparatus by communicating with the first information processing apparatus and the second information processing apparatus,
determining, upon detecting that operations have stopped at both the first information processing apparatus and the second information processing apparatus, whether there is a power failure state at the first information processing apparatus and the second information processing apparatus based on presence of a first power failure signal and presence of a second power failure signal respectively for determination as to whether the first information processing apparatus is stopped due to a power failure of a first power supply and whether the second information processing apparatus is stopped due to a power failure of a second power supply, the first power supply supplying power to the first memory, the second power supply supplying power to the second memory, the first power failure signal being output from the first information processing apparatus and indicating the power failure of the first power supply, the second power failure signal being output from the second information processing apparatus and indicating the power failure of the second power supply, and
restarting, when there is no power failure at the first information processing apparatus and there is no power failure at the second information processing apparatus, the first information processing apparatus in a state where data of the first memory is held and the second information processing apparatus in a state where data of the second memory is held.

8. A non-transitory computer-readable storage medium storing a control program that causes a computer to perform a procedure comprising:
executing a process for monitoring operations of a first information processing apparatus and a second information processing apparatus by communicating with the first information processing apparatus and the second information processing apparatus, the first information processing apparatus including a first memory with a cache region, the second information processing apparatus including a second memory with a mirror cache that stores mirror data for data stored in the cache region,
determining, upon detecting that operations have stopped at both the first information processing apparatus and the second information processing apparatus, whether there is a power failure state at the first information processing apparatus and the second information processing apparatus based on presence of a first power failure signal and presence of a second power failure signal respectively for determination as to whether the first information processing apparatus is stopped due to a power failure of a first power supply and whether the second information processing apparatus is stopped due to a power failure of a second power supply, the first power supply supplying power to the first memory, the second power supply supplying power to the second memory, the first power failure signal being output from the first information processing apparatus and indicating the power failure of the first power supply, the second power failure signal being output from the second information processing apparatus and indicating the power failure of the second power supply, and
restarting, when there is no power failure at the first information processing apparatus and there is no power failure at the second information processing apparatus, the first information processing apparatus in a state where data of the first memory is held and the second information processing apparatus in a state where data of the second memory is held.

* * * * *